United States Patent
Kamiya et al.

(10) Patent No.: US 6,659,358 B2
(45) Date of Patent: Dec. 9, 2003

(54) VEHICLE AIR CONDITIONER HAVING SURFACE TEMPERATURE SENSOR

(75) Inventors: Toshifumi Kamiya, Takahama (JP); Takayoshi Kawai, Hoi-gun (JP); Akira Ohga, Ichinomiya (JP); Yuichi Kajino, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/000,608

(22) Filed: Oct. 24, 2001

(65) Prior Publication Data

US 2002/0053601 A1 May 9, 2002

(30) Foreign Application Priority Data

Oct. 26, 2000 (JP) .......................... 2000-327509
Dec. 8, 2000 (JP) .......................... 2000-374290

(51) Int. Cl.[7] .............................. G05D 23/00; F24F 7/00
(52) U.S. Cl. ................... 236/49.3; 236/91 C; 165/204; 454/75
(58) Field of Search .................... 236/49.3, 51, 91 C; 454/75; 165/204

(56) References Cited

U.S. PATENT DOCUMENTS

| | | | | |
|---|---|---|---|---|
| 5,170,935 A | * | 12/1992 | Federspiel et al. | 236/44 C |
| 5,187,943 A | | 2/1993 | Taniguchi et al. | 62/180 |
| 5,400,964 A | | 3/1995 | Freiberger | 236/91 C |
| 5,582,234 A | * | 12/1996 | Samukawa et al. | 165/204 |
| 6,202,934 B1 | * | 3/2001 | Kamiya et al. | 236/91 C |

FOREIGN PATENT DOCUMENTS

JP    A-11-157324    6/1999

* cited by examiner

*Primary Examiner*—William Wayner
(74) *Attorney, Agent, or Firm*—Harness, Dickey & Pierce, PLC

(57) ABSTRACT

The air conditioner includes a surface temperature sensor for detecting a surface temperature of a clothes portion of a passenger. In the air conditioner, a thermal-feeling estimation value for the passenger is calculated based on the surface temperature of the clothes portion of the passenger, and air-conditioning operation of a passenger compartment is controlled based on the thermal-feeling estimation value. Accordingly, in the air conditioner, the thermal feeling can be always accurately estimated, and comfortable air-conditioning control can be performed using the thermal-feeling estimation value.

52 Claims, 24 Drawing Sheets

VEHICLE AIR CONDITIONER HAVING SURFACE TEMPERATURE SENSOR

CROSS-REFERENCE TO RELATED APPLICATION

This application is related to and claims priority from Japanese Patent applications No. 2000-327509 filed on Oct. 26, 2000, and No. 2000-374290 filed on Dec. 8, 2000, the contents of which are hereby incorporated by reference.

BACKGROUND OF THE INVENTION

1. Field of the Invention

The present invention relates to a vehicle air conditioner which performs air-conditioning control in a passenger compartment by estimating thermal feeling of a passenger.

2. Description of Related Art

U.S. Pat. No. 5,187,943 discloses a vehicle air conditioner which performs air-conditioning control based on a passenger's thermal feeling estimated by using a face skin temperature of the passenger, detected by an infrared ray sensor (surface temperature sensor). In the conventional air conditioner, it is important how the face skin temperature of the passenger is accurately detected. Actually, a direction of the face of the passenger is changed, and the face moves in an up-down direction and in a right-left direction. Therefore, the face is sometimes displaced outside a detection area of the infrared sensor. Therefore, the face skin temperature of the passenger cannot be accurately and stably detected, and it is difficult to always accurately estimate the thermal feeling of the passenger.

On the other hand, JP-A-11-157324 discloses a vehicle air conditioner which automatically controls an air outlet mode in the following manner in order to improve heating feeling in a warming-up control operation. Because a temperature of conditioned air blown into a passenger compartment is very low at an initial time in the warming-up control operation, cool feeling is given to the passenger by the conditioned air when the conditioned air is blown to the upper half body of the passenger. Accordingly, in this conventional air conditioner, a foot mode, where conditioned air is not blown toward the upper half body of the passenger, is set at the initial time in the warming-up control operation. Thereafter, as the temperature of conditioned air is increased, the air outlet mode is changed from the foot mode to a bi-level mode, thereby warming hands of the passenger as fast as possible. Then, when the temperature of the conditioned air is further increased, the air outlet mode is again changed from the bi-level mode to the foot mode, thereby preventing warm air from being blown toward the upper side of the passenger compartment from a face air outlet. However, the bi-level mode is switched to again the foot mode based on a detection result of an environmental condition such as solar radiation intensity, inside air temperature and outside air temperature. Therefore, the switching time sometimes does not correspond to the thermal feeling of the passenger and deteriorates air-conditioning feeling of the passenger. For example, the thermal feeling of the passenger is greatly changed between a case where solar radiation directly reaches to the passenger and a case where solar radiation does not directly reach to the passenger even when solar radiation intensity detected by a solar radiation sensor is not changed therebetween. Accordingly, if the air outlet mode switching is performed when the solar radiation intensity detected by the solar radiation sensor becomes equal to a predetermined intensity, cool feeling or hot feeling may be given to the passenger, thereby deteriorating air-conditioning feeling.

SUMMARY OF THE INVENTION

In view of the foregoing problems, it is a first object of the present invention to provide a vehicle air conditioner which can always perform an accurate estimation of thermal feeling of a passenger and can perform comfortable air-conditioning control.

It is a second object of the present invention to provide a vehicle air conditioner which can perform a switching from a first mode such as a bi-level mode to a second mode such as a foot mode at a time sufficiently adapting to thermal feeling of a passenger.

According to an aspect of the present invention, in a vehicle air conditioner, a surface temperature sensor is disposed for detecting a surface temperature on a clothes portion of a passenger and for outputting a clothes temperature signal, estimation-value calculating means calculates an estimation value of thermal feeling for a passenger in the passenger compartment based on the clothes temperature signal, and a control unit performs air-conditioning control in the passenger compartment based on the estimation value of the thermal feeling. The clothes portion has a larger area than a face portion of the passenger, and a movement distance of the clothes portion is smaller than that of the face portion of the passenger in a seating condition. Therefore, irrespective of movement, a physique, seating posture and the like of the passenger, the clothes portion hardly deviates from a temperature detection range of the surface temperature sensor, and the surface temperature can be accurately and stably detected. Accordingly, the thermal feeling can be always accurately estimated, thereby always accurately performing air-conditioning control based on the thermal feeling.

Since a change of surface temperature relative to a change of the thermal feeling is larger on the clothes portion than that on the face skin portion, surface temperature of the clothes portion can be more readily used as a control signal.

Preferably, the control unit performs the air-conditioning control in the passenger compartment, in accordance with a difference between the estimation valve, and a target value of the thermal feeling that is an estimation value of target thermal feeling comfortable for the passenger, in such a manner that the estimation value of the thermal feeling coincides with the target value of the thermal feeling. Because the air-conditioning is performed so that the estimation value of the thermal feeling coincides with the target value of the thermal feeling, air-conditioning control comfortable for the passenger can be readily performed.

According to an another aspect of the present invention, a surface temperature sensor is disposed for detecting a surface temperature of a passenger in the passenger compartment, and a mode switching unit is disposed to automatically switch one of a first mode where air is blown at least toward an upper side of the passenger in the passenger compartment, and a second mode where air is blown at least toward a lower side of the passenger while a flow of air blown toward the upper side of the passenger is interrupted. In addition, the mode switching unit switches between the first mode and the second mode based on the surface temperature of the passenger detected by the surface temperature sensor. That is, switching operation between the first mode and the second mode is performed based on the surface temperature of the passenger which is information having strong correlation with the thermal feeling of the passenger. Therefore, one of the first mode and the second mode can be readily switched at a suitable time corresponding to the thermal feeling of the passenger.

Preferably, when the surface temperature of the passenger is lower than a first predetermined temperature in a warming-up control operation where temperature of air blown into the passenger compartment is increased after heating in the passenger compartment is started, the first mode is selected by the mode switching unit. On the other hand, when the surface temperature of the passenger is higher than the first predetermined temperature in the warming-up control operation, the second mode is selected by the mode switching unit. Accordingly, when heating is started, hands and the likes of the passenger can be rapidly heated using the first mode, and a heating acceleration effect can be ensured in the upper half body of the passenger. On the other hand, heating feeling can be also prevented from being uncomfortable due to the first mode.

Alternatively, a vehicle air conditioner includes a first mode switching unit for switching one of a plurality of modes in accordance with an air-conditioning condition, a surface temperature sensor for detecting a surface temperature of the passenger in the passenger compartment, and a second mode switching unit for switching one of a first mode and a second mode in accordance with the surface temperature of the passenger detected by the surface temperature sensor. The plurality of modes at least including the first mode where air is blown at least toward an upper side of a passenger in the passenger compartment, and the second mode where air is blown at least toward a lower side of the passenger while a flow of air blown toward the upper side of the passenger is interrupted. In addition, the first mode switching unit switches one of the plurality of modes in an air-conditioning stationary operation, and the second mode switching unit switches one of the first mode and the second mode in a warming-up control operation where temperature of air is increased after heating in the passenger compartment is started. Accordingly, the air-conditioning control can be suitably performed, while comfortable thermal feeling is given to the passenger.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Embodiment)

Figure 1:
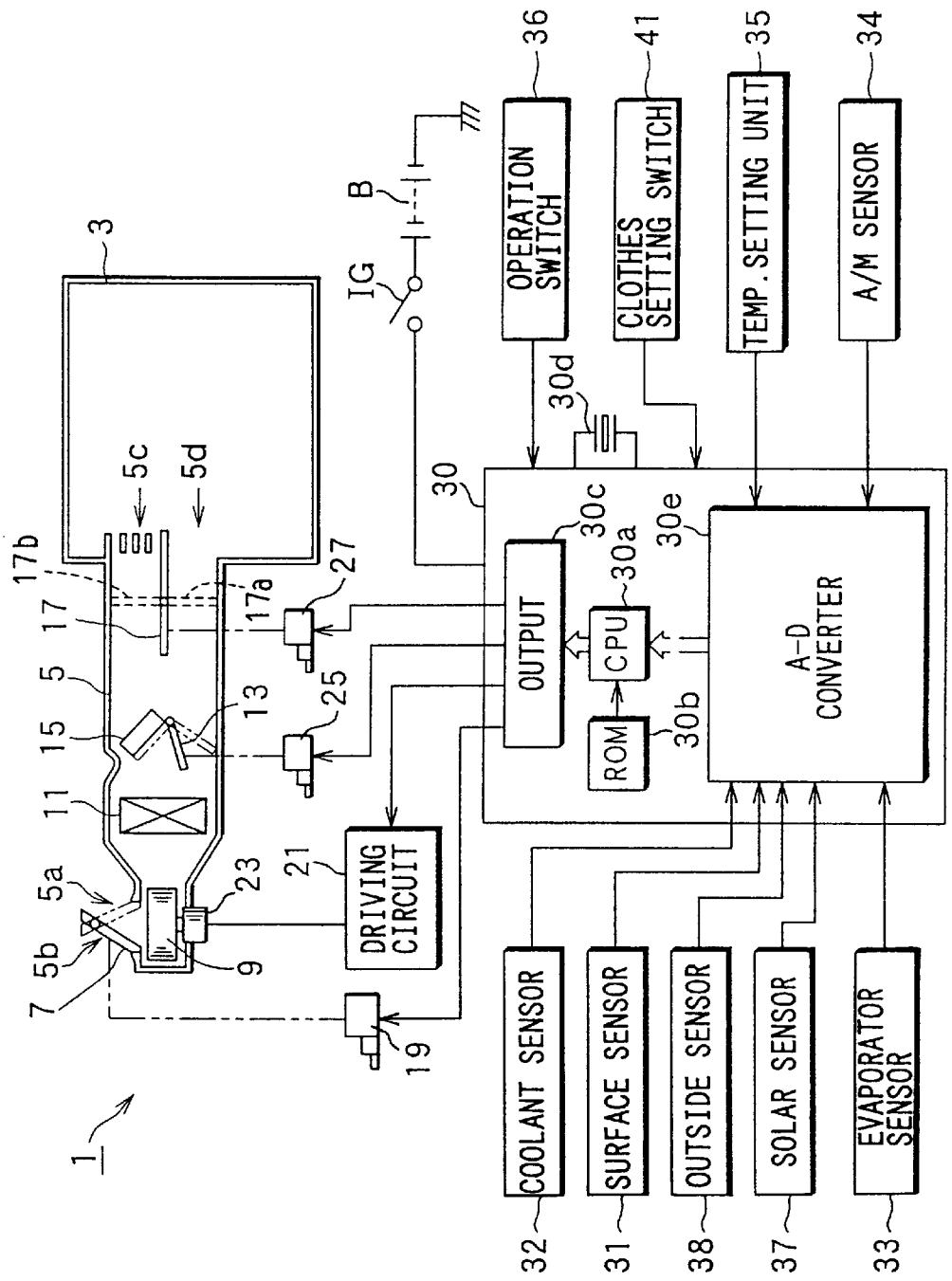
FIG. 1 is a schematic diagram showing an entire construction of a vehicle air conditioner according to a first embodiment of the present invention.

A first preferred embodiment of the present invention will be now described with reference to FIGS. 1–13. An air conditioner 1 shown in FIG. 1 is disposed at a front side in a passenger compartment 3. In an air duct 5 of the air conditioner 1, an inside/outside air switching damper 7, a blower 9, an evaporator (cooling heat exchanger) 11, an air mixing damper 13, a heater core (heating heat exchanger) 15 and a mode switching damper 17 are provided within the air duct 5 in this order from an upstream air side toward a downstream air side.

When the inside/outside air switching damper 7 is switched to a first switching position (shown by the solid line in FIG. 1) by a servomotor 19, outside air outside the passenger compartment 3 is introduced into the air duct 5 from an outside air introduction port 5a. On the other hand, when the inside/outside air switching damper 7 is switched to a second switching position (shown by the chain line in FIG. 1), air (inside air) inside the passenger compartment 3 is introduced into the air duct 5 from the inside air introduction port 5b.

The blower 9 blows outside air introduced from the outside air introduction port 5a or inside air introduced from the inside air introduction port 5b to the evaporator 11 in accordance with a revolution speed of a blower motor 23 driven by a driving circuit 21. The evaporator 11 cools air blown from the blower 9 using refrigerant circulating in a refrigerant cycle system of the air conditioner. The driving circuit 21 and the blower motor 23 construct an air-amount adjusting unit for adjusting an amount of air blown into the passenger compartment 3.

The air mixing damper 13 is driven by a servomotor 25. A part of cool air from the evaporator 11 flows through the heater core 15, and the residual other part of cool air from the evaporator 11 bypasses the heater core 15. The air mixing damper 13 and the servomotor 25 construct a temperature adjusting unit for adjusting temperature of air blown into the passenger compartment in the first embodiment.

In a face mode for blowing air toward the upper body of a passenger in the passenger compartment 3, the mode switching damper 17 is switched to a first switching position 17a (shown by the chain line in FIG. 1) by a servomotor 27, so that air is blown toward the upper body of the passenger in the passenger compartment 3 from an air outlet 5c of the air duct 5. In a foot mode for blowing air toward the foot area of the passenger in the passenger compartment 3, the mode switching damper 17 is switched to a second switching position 17b (shown by a broken line in FIG. 1), so that air is blown toward the foot area of the passenger in the passenger compartment 3 from an air outlet 5d of the air duct 5. In a bi-level mode, the mode switching damper 17 is switched to a third switching position (shown by the solid line in FIG. 1), so that air is blown from both the air outlets 5c, 5d.

The servomotor 19, the driving circuit 21, the servomotors 25, 27 receive control signals from an electronic control unit (ECU) 30 to drive the inside/outside air switching damper 7, the blower 9, the air mixing damper 13 and the mode switching damper 17, respectively.

The ECU 30 reads output signals from a surface temperature sensor 31 (non-contact temperature sensor), a water temperature sensor 32 (coolant sensor), an evaporator-outlet temperature sensor 33, an open degree sensor (A/M open degree sensor) 34, a temperature setting unit 35, a solar radiation sensor 37, an outside air temperature sensor 38 and the like through an A/D converter 30. The surface temperature sensor 31 detects surface temperature Tir of a temperature-detected body, the water temperature sensor 32 detects temperature (water temperature) Tw of cooling water of a vehicle engine, the evaporator-outlet temperature sensor 33 detects temperature (evaporator temperature) Te of cool air immediately after passing through the evaporator 11, the A/M open degree sensor 34 contained in the servomotor 25 detects an actual open degree θ of the air mixing damper 13, the solar radiation sensor 37 detects intensity (solar radiation intensity) Ts of solar radiation entering into the passenger compartment 3 and the outside air temperature sensor 38 detects outside air temperature Tam. Further, a set temperature Tset in the passenger compartment is set by the temperature setting unit 35 according to preference of a passenger.

Further, the ECU 30 reads signals from an operation switch 36 for starting and stopping operation of the air conditioner, and from a clothed-amount setting switch (clothes amount setting unit) 41 for setting a clothed amount of a passenger (e.g., heavy clothes and light clothes).

The ECU 30, for performing air-conditioning control based on the above signals, is composed of a central processing unit (CPU) 30a, a read only memory (ROM) 30b, an output portion 30c and a crystal oscillator 30d. The CPU 30a receives each signal and calculates each operation amount of the above components, and the ROM 30b stores execution commands of a flow diagram described later. The output portion 30c outputs control signals to each of the above components in accordance with the operation amounts calculated by the CPU 30a. The crystal oscillator 30d generates a standard clock pulse at several megahertz so that the CPU 30a executes digital operation processings based on software.

When an ignition switch IG is turned on, the ECU 30 is energized by a battery B and becomes to an operation capable condition. Then, when the operation switch 36 is turned on, the ECU 30 starts air-conditioning control.

Next, the surface temperature sensor 31 (non-contact temperature sensor) will be now described in detail. The surface temperature sensor 31 according to the first embodiment is an infrared sensor for generating an electrical signal in accordance with intensity of infrared rays radiated from a temperature-detected body, more specifically, is an infrared sensor using a thermopile detector for generating electromotive force proportional to the intensity of infrared rays.

Figure 2:
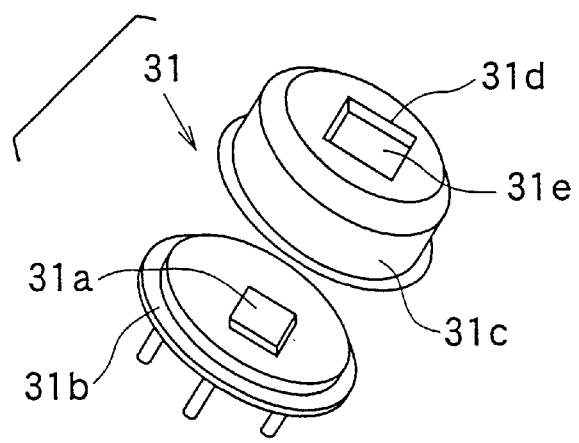
FIG. 2 is an exploded perspective view showing a surface temperature sensor shown in FIG. 1.
Figure 3:
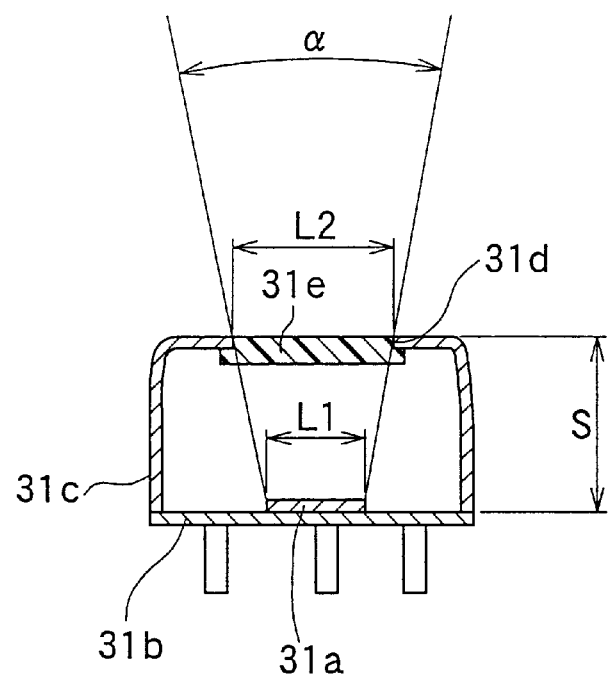
FIG. 3 is a schematic sectional view showing the surface temperature sensor according to the first embodiment.

In the surface temperature sensor 31, as shown in FIGS. 2, 3, a detection portion (detection element) 31a for detecting infrared rays is disposed on a substrate 31a and is covered by a metal cup case 31c. A bottom portion of the case 31c has a four-sided opening 31d, and a silicon cover 31e is fitted in the opening 31d. A side dimension L1 of a detection portion 31a, a side dimension L2 of the opening 31d and a dimension S between the detection portion 31a and the opening 31d are suitably set, thereby adjusting an angular range (visibility angle) α where temperature can be detected.

Figure 4:
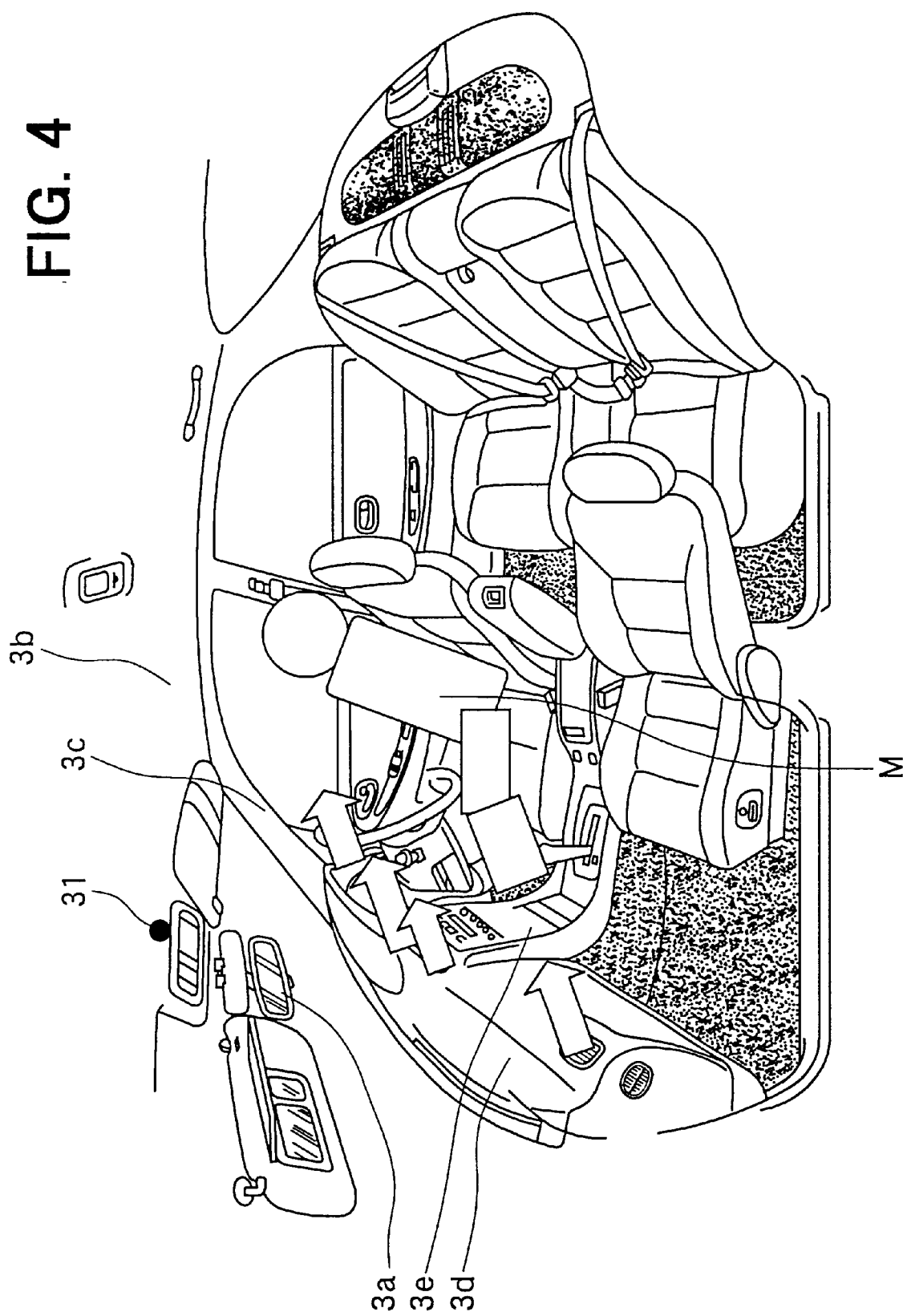
FIG. 4 is a perspective view showing a set position of the surface temperature sensor in a passenger compartment, according to the first embodiment.

As shown in FIG. 4, the surface temperature sensor 31 is disposed on a ceiling 3b around a rearview mirror 3a at a front from a passenger M (i.e., driver M). Further, the surface temperature sensor 31 is set toward an upper half body of the passenger M except for a face portion thereof, to detect the surface temperature Tir of the clothes portion of the passenger M at the upper half body (more specifically, a chest portion and a belly portion). The surface temperature sensor 31 can be disposed on a vehicle pillar 3c, for example.

Figure 5:
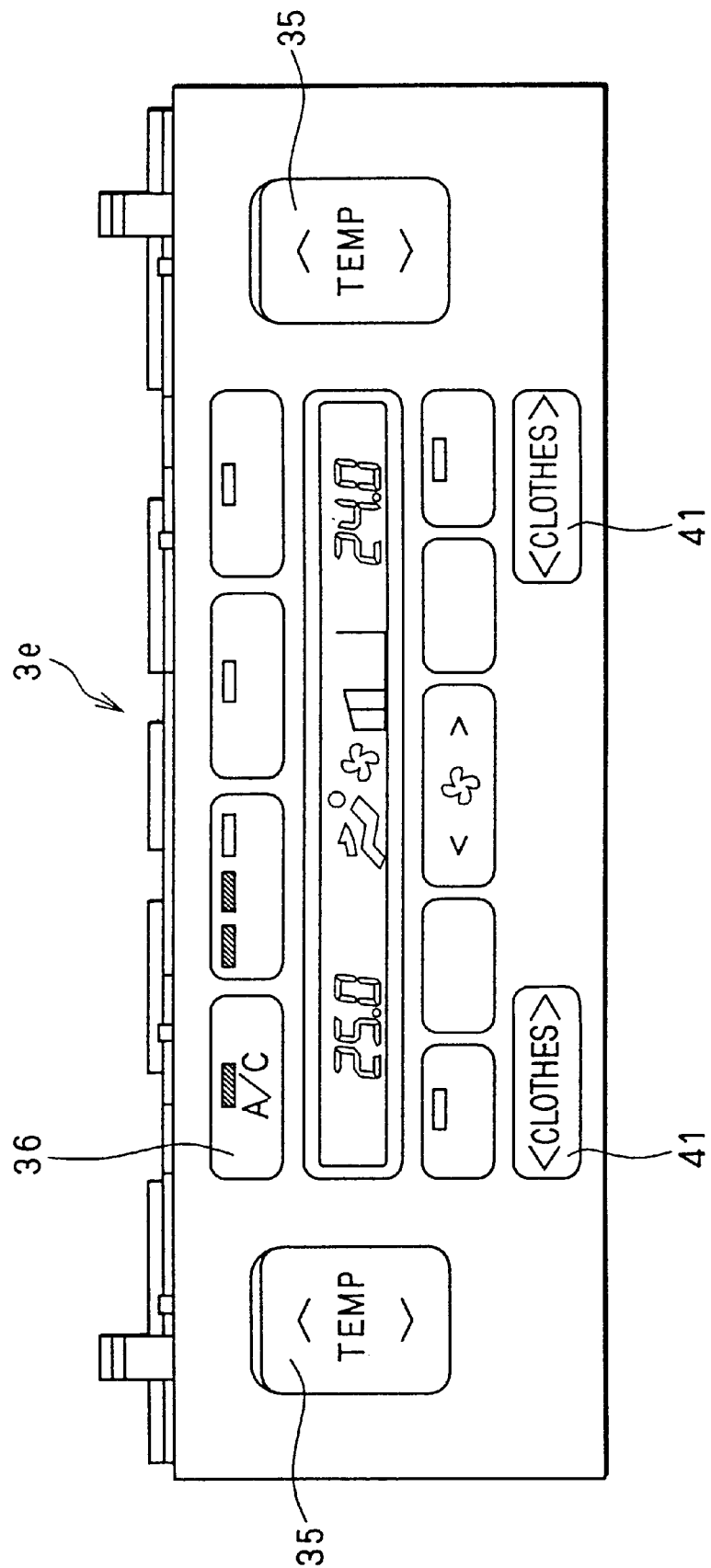
FIG. 5 is an enlarged front view showing an operation panel shown in FIG. 4.

In FIG. 4, an operation panel 3e is disposed on an instrument panel 3d at a center portion in a vehicle right-left direction. As shown in FIG. 5, the temperature setting unit 35, the operation switch 36, the clothes-amount setting switch 41 and the like operatable by the passenger M are disposed on the operation panel 3e.

Next, the air-conditioning control performed by the ECU 30 will be now described with reference to the flow diagram shown in FIG. 6. When the air-conditioning control is started, counters and flags, used for later processings, are initialized at step S100. Thereafter, at step S110, the ECU 30 reads switch signals such as the set temperature Tset from the temperature setting unit 35 and the clothes amount from the clothes-amount setting switch 41.

At step S120, the ECU 30 reads a signal of clothes-surface temperature Tir detected by the surface temperature sensor 31 and signals from the other sensors 32–34, 37, 38. Steps S110, S120 constitute a signal input unit for inputting information signals required for the air-conditioning control.

At step S130, thermal feeling, felt by a passenger now, is estimated and is indicated using a numerical value based on the clothes surface temperature Tir and vehicle environmental information (e.g., solar radiation intensity TS) relative to the thermal feeling of the passenger. That is, a thermal-feeling estimation value Ss, in which the thermal feeling of the passenger is indicated using the numerical value, is calculated using formula (1) stored in the ROM 30b. Step S130 constitutes thermal-feeling value calculating means for calculating the thermal-feeling estimation value Ss.

Figure 7:
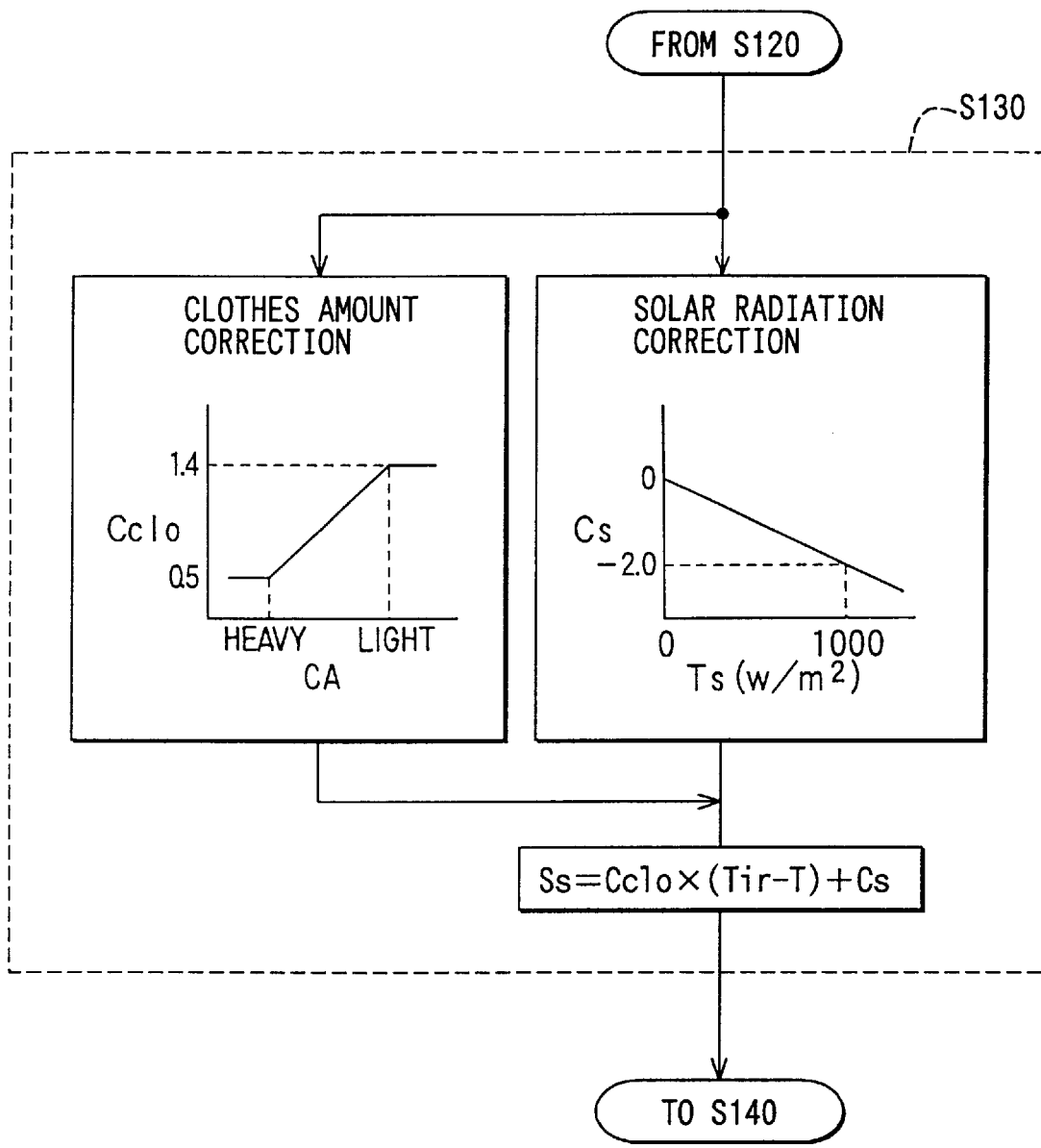
FIG. 7 is a flow diagram showing a control process at step S130 shown in FIG. 6.

As shown in FIG. 7, detail processing at step S130 is as follows. A relationship between the thermal feeling and the clothes surface temperature Tir is changed by the clothes amount. Therefore, a clothes-amount correction coefficient Cclo is obtained from the clothes amount CA read at step S110 to correct this change. Further, the relationship between the thermal feeling and the clothes surface temperature Tir is changed due to solar radiation intensity Ts. Therefore, a solar radiation correction value Cs is further obtained from the solar radiation intensity Ts read at step S120 to correct this change. Thereafter, the thermal-feeling estimation value Ss is calculated using the following formula (1) based on the correction coefficient Cclo, the solar radiation correction value Cs and the clothes surface temperature Tir.

$$Ss = Cclo \times (Tir - T) + Cs \quad (1)$$

wherein, a constant T indicates a clothes surface temperature (e.g., the constant T is about 27° C. when the solar radiation is not considered in the outside air temperature of 20° C.).

For example, when the thermal-feeling estimation value Ss, calculated using the formula (1), is zero, it is estimated that there is non-thermal feeling of the passenger M, that is, it is estimated that the passenger M does not feel warm and cool.

When the thermal-feeling estimation value Ss is positive, the thermal feeling of the passenger M is changed from warm feeling to hot feeling as the thermal-feeling estimation value Ss increases. Specifically, when the thermal-feeling estimation value Ss is +1, the thermal feeling is estimated to be slightly warm feeling. When the thermal-feeling estimation value Ss is +2, it is estimated to be general warm feeling. When the thermal-feeling estimation value Ss is +3, it is estimated to be slightly hot feeling. When the thermal-feeling estimation value Ss is +4, it is estimated to be hot feeling. In addition, when the thermal-feeling estimation value Ss is +5, it is estimated to be very hot feeling.

On the other hand, when the thermal-feeling estimation value Ss is negative, the thermal feeling of the passenger M is changed from cool feeling to cold feeling as the thermal-feeling estimation value Ss decreases. Specifically, when the thermal-feeling estimation value Ss is −1, the thermal feeling is estimated to be slightly cool feeling. When the thermal-feeling estimation value Ss is −2, it is estimated to be cool feeling. When the thermal-feeling estimation value Ss is −3, it is estimated to be slightly cold feeling. When the thermal-feeling estimation value Ss is −4, it is estimated to be cold feeling. Further, when the thermal-feeling estimation value Ss is −5, it is estimated to be very cold feeling.

At step S135, the thermal feeling comfortable for the passenger M in various vehicle environmental conditions, is indicated using a numerical value based on vehicle environmental information (e.g., the outside air temperature Tam and the solar radiation intensity Ts) relative to the thermal feeling of the passenger M and the thermal feeling information (e.g., the set temperature Tset) determined by preference of the passenger M. That is, a thermal-feeling target value St, at which the thermal feeling comfortable for the passenger M is indicated using the numerical value, is calculated using the formula (2). Step S135 constructs thermal-feeling target value calculating means for calculating the thermal-feeling target value St.

Figure 8:
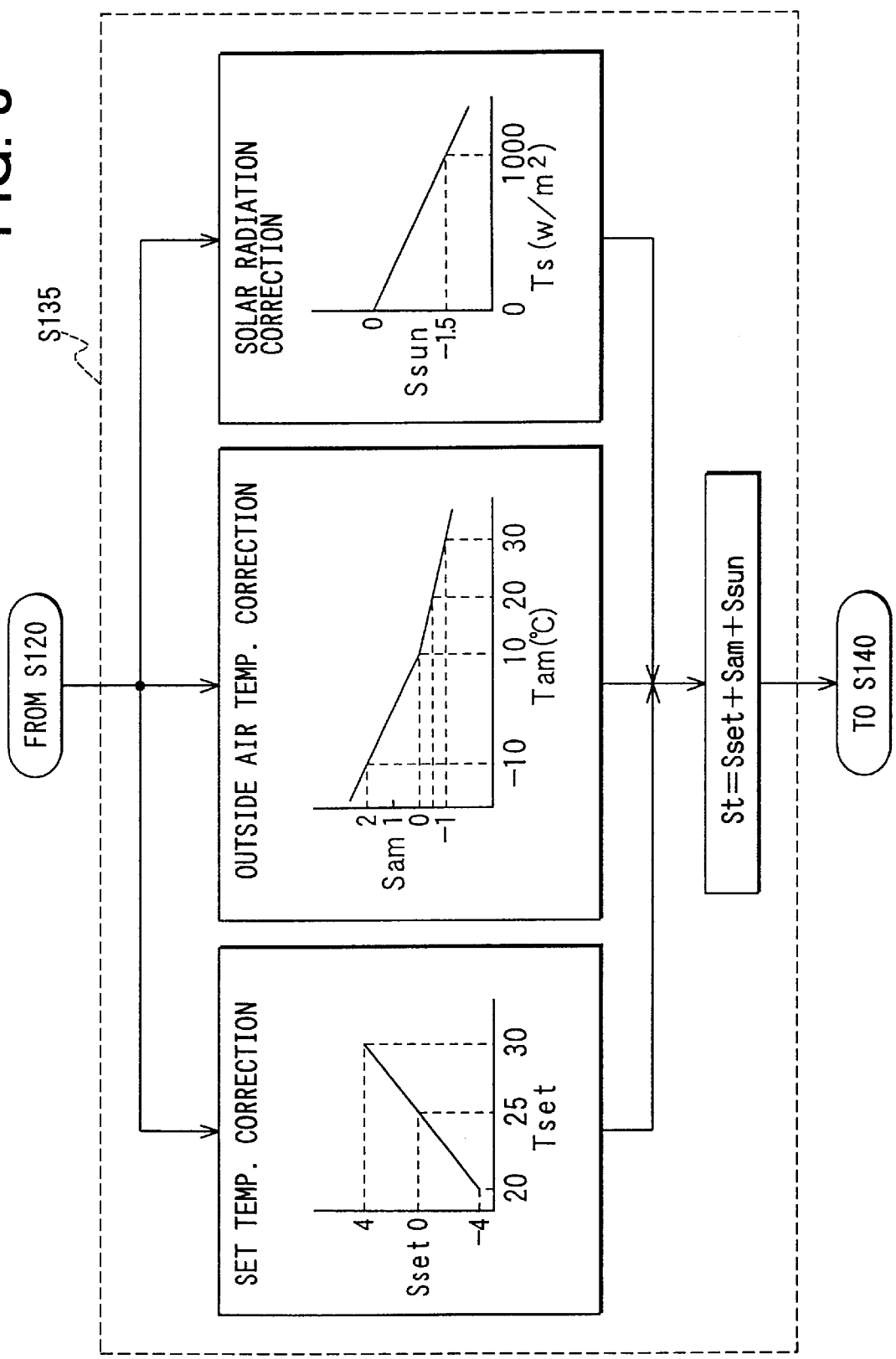
FIG. 8 is a flow diagram showing a control process at step S135 shown in FIG. 6.
Figure 9:
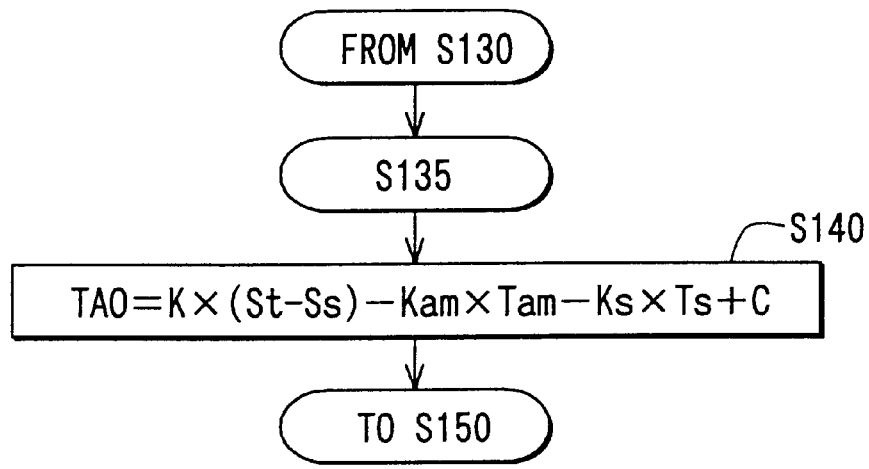
FIG. 9 is a flow diagram showing a control process at step S140 shown in FIG. 6.

As shown in FIG. 8, a detail control processing at step S135 is as follows. That is, a set temperature correction value Sset is obtained from the set temperature Tset read at step S110 for reflecting the preference temperature of the passenger M. Further, because the thermal feeling comfortable for the passenger M is changed in accordance with the outside air temperature Tam, an outside temperature correction value Sam is obtained from the outside air temperature Tam read at step S120. Furthermore, because the thermal feeling is changed in accordance with the solar radiation intensity Ts, a solar radiation correction value Ssun is obtained from the solar radiation intensity Ts read at step S120. Thus, a thermal feeling target value St is calculated in accordance with the following formula (2) by using these correction values Sset, Sam, Ssun.

$$St = Sset + Sam + Ssun \quad (2)$$

When warm air-conditioning control is performed in a case where the thermal feeling target value St, calculated using the formula (2), is positive and small, the passenger M feels comfortable. When hot air-conditioning control is performed in a case where the thermal feeling target value St is positive and large, the passenger M feels comfortable.

On the other hand, when cool air-conditioning control is performed in a case where the thermal feeling target value St is negative and its absolute value is small, the passenger M feels comfortable. Further, when cold air-conditioning control is performed in a case where the thermal feeling target value St is negative and its absolute value is large, the passenger M feels comfortable.

At step S140 (see FIG. 9), a target air temperature TAO, that is a target control temperature of air blown into a passenger compartment, is calculated using the following formula (3) stored in the ROM 30b based on the thermal feeling target value St calculated at step 135 and the thermal-feeling estimation value Ss calculated at step S130. Step S140 constitutes target air temperature calculating means for calculating the target air temperature TAO.

$$TAO=K\times(St-Ss)-Kam\times Tam-Ks\times Ts+C \quad (3)$$

wherein, K indicates a control coefficient, Kam indicates an outside temperature correction coefficient, Ks indicates a solar radiation correction coefficient, and C indicates a constant.

Then, the following control is performed based on the target air temperature TAO calculated using the formula (3). Air-conditioning control is performed so that the thermal-feeling estimation value Ss coincides with the thermal feeling target value St. That is, the air-conditioning control is performed in a control direction where the passenger M feels to be comfortable. In the formula (3), further, the target air temperature TAO is calculated using the correction coefficients of the outside air temperature Tam and the solar radiation intensity Ts. That is, the target air temperature TAO is calculated while vehicle thermal loads is considered.

Figure 6:
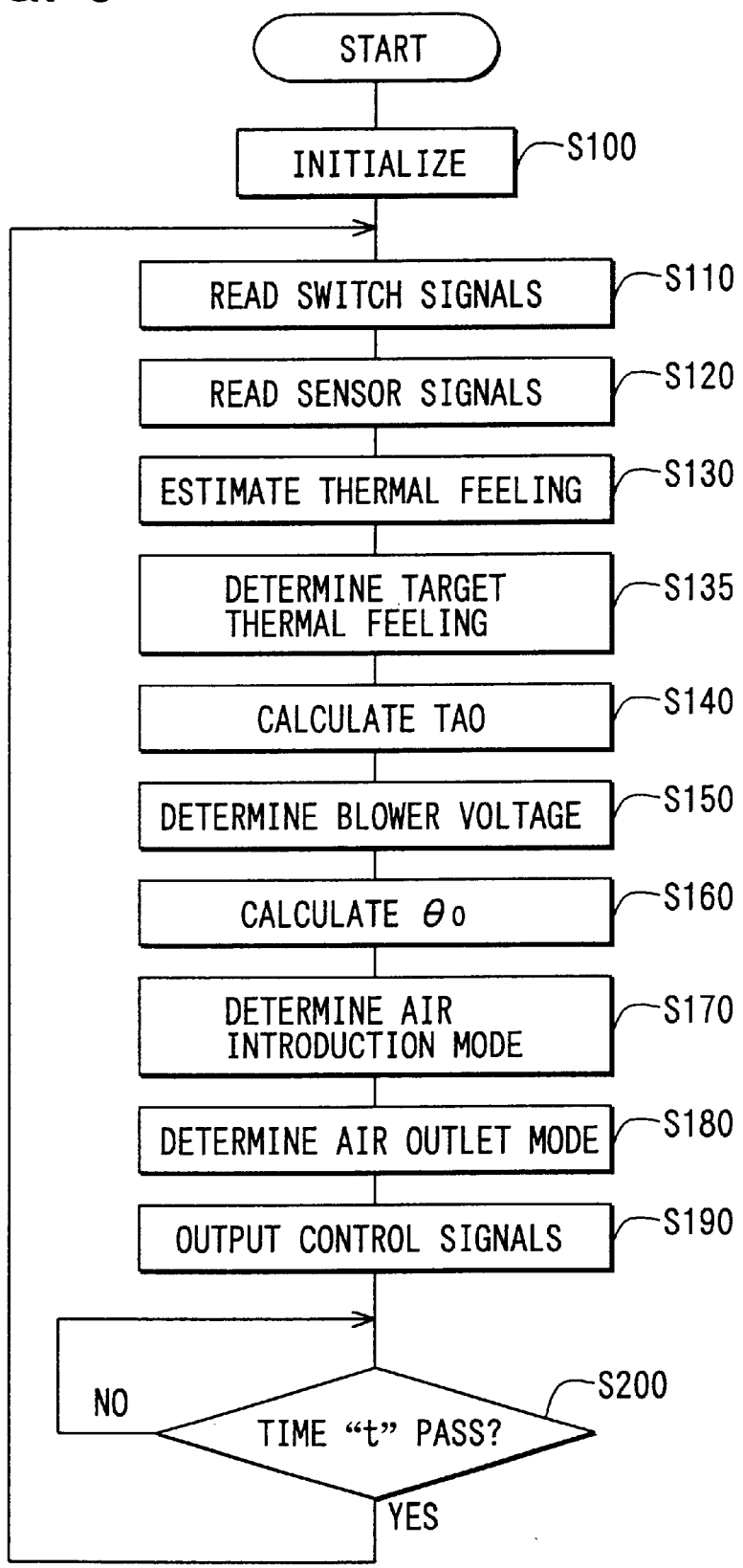
FIG. 6 is a flow diagram showing air-conditioning control performed by an electronic control unit, according to the first embodiment.
Figure 10:
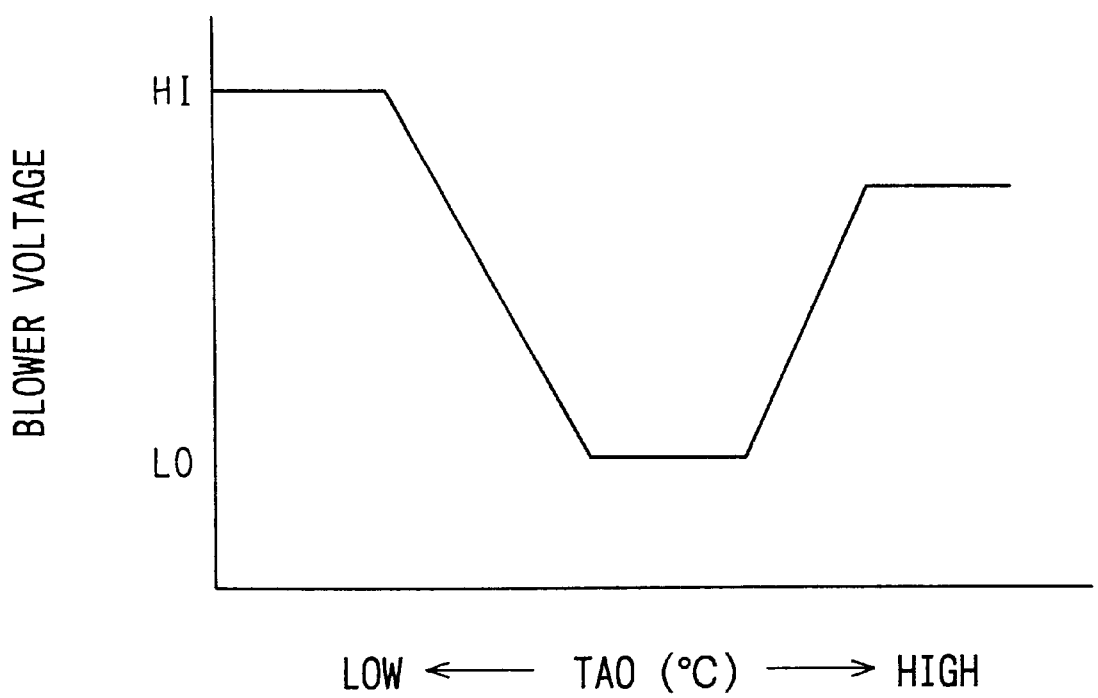
FIG. 10 is a characteristic graph showing a relationship between a target air temperature and a blower voltage in the first embodiment.

At step S150 in FIG. 6, a voltage (blower voltage) applied to the blower motor 23, which corresponds to a target air amount TAO, is determined using the characteristic map shown in FIG. 10 stored in the ROM 30b, based on the target air temperature TAO calculated at step S140.

At step S160, a target open degree θo of the air mixing damper 13 is calculated using the following formula (4) stored in the ROM 30b based on the water temperature Tw, the evaporator temperature Te and the target air temperature TAO. The water temperature Tw and the evaporator temperature Te are read at step S120, and the target air temperature TAO is calculated at step S140.

$$\theta o=[(TAO-Te)/(Tw-Te)]\times 100(\%) \quad (4)$$

Figure 11:
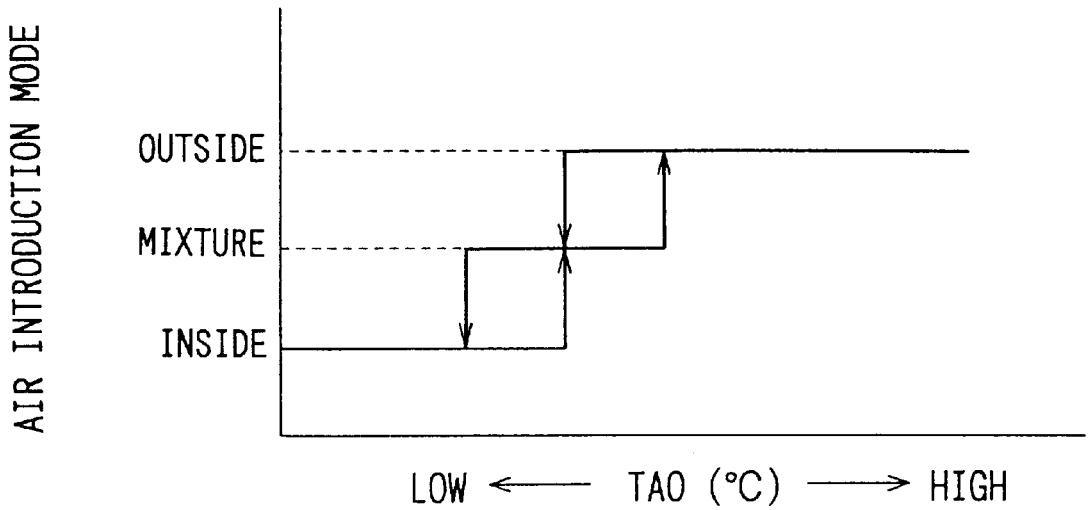
FIG. 11 is a characteristic graph showing a relationship between the target air temperature and an air introduction mode in the first embodiment.

At step S170, an air introduction mode is determined among an inside air introduction mode, an outside air introduction mode and an inside/outside air mixing mode (half inside air mode) using a characteristic map shown in FIG. 11, stored in the ROM 30b, based on the target air temperature TAO.

Figure 12:
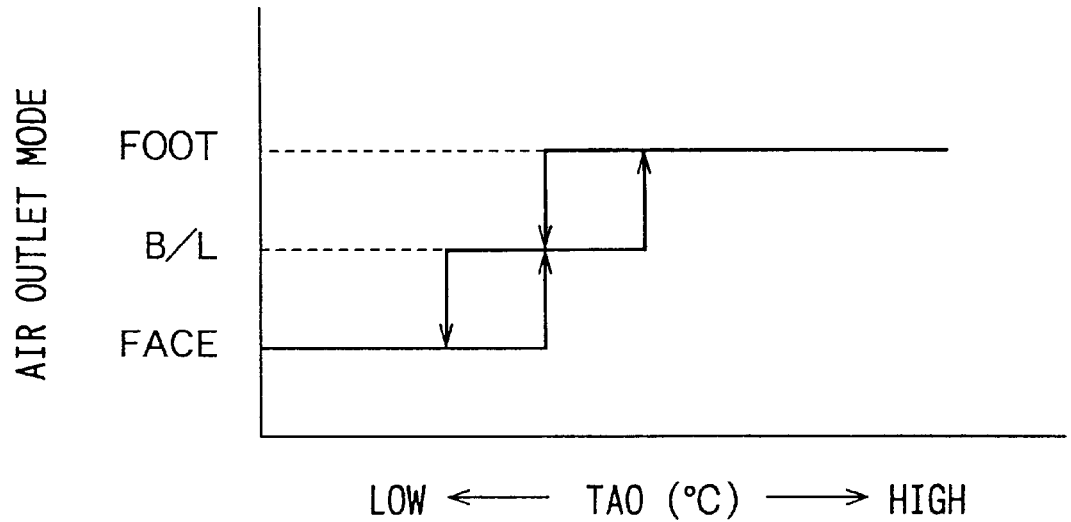
FIG. 12 is a characteristic graph showing a relationship between the target air temperature and an air outlet mode in the first embodiment.

At step S180, an air outlet mode is determined among a face mode (FACE), a bi-level mode (B/L) and a foot mode (FOOT) using the characteristic map shown in FIG. 12, stored in the ROM 30b, based on the target air temperature TAO.

At step S190, a blower-voltage control signal, an air-mixing-damper open degree control signal, an inside/outside air introduction mode control signal and an air outlet mode control signal are outputted to the driving circuit 21 and the servomotors 25, 19, 27, respectively, in accordance with calculation results at steps S150–S180.

At step S200, it is determined whether a cycle time of "t" passes. After the cycle time "t" passes, the control routine returns to step S110.

Each component of the vehicle air conditioner 1 is operated based on control signals outputted at step S190, and air-conditioning control is performed so that the thermal-feeling estimation value Ss coincides with the thermal feeling target value St, thereby realizing the air-conditioning control comfortable for the passenger M.

Figure 13:
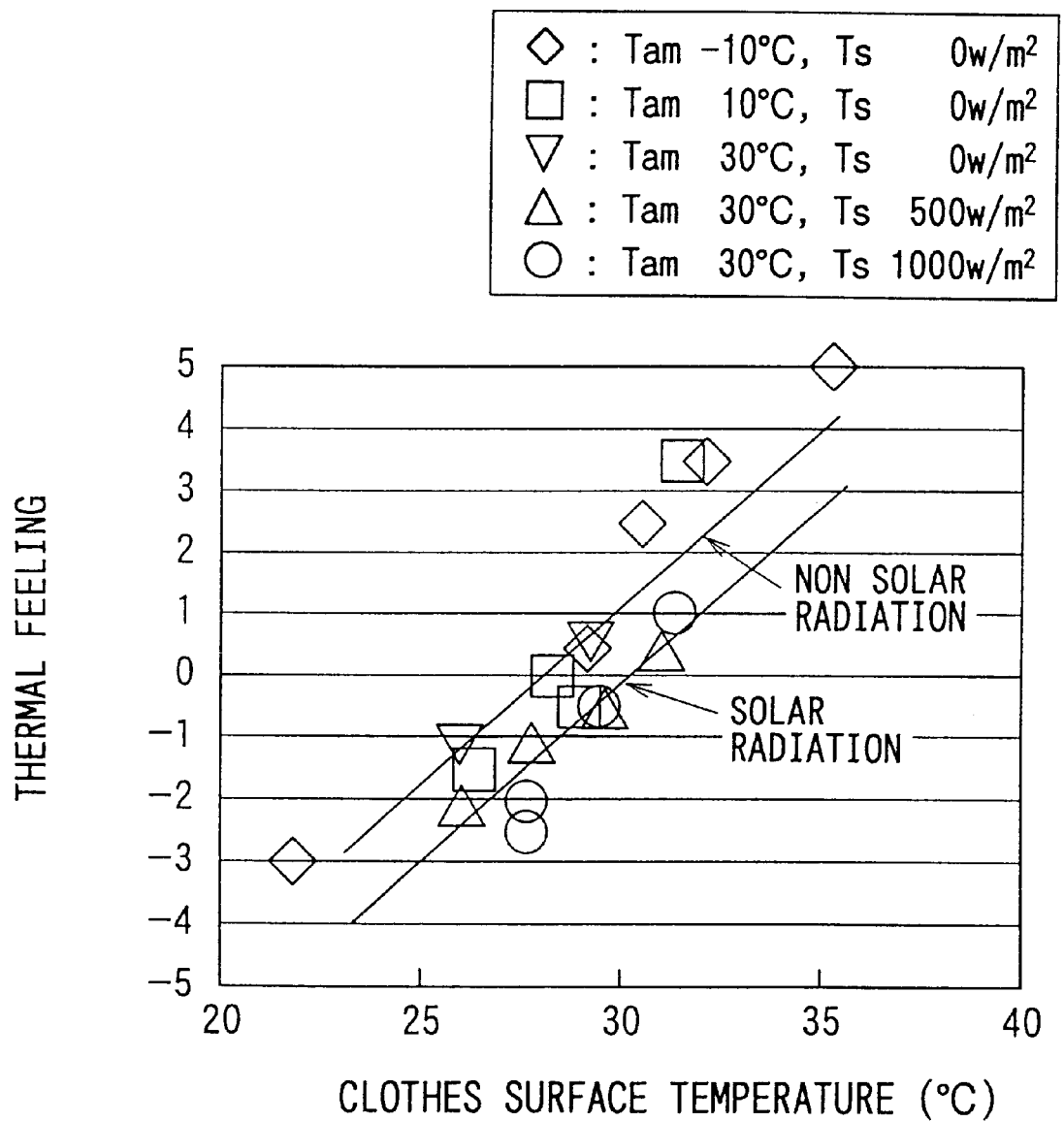
FIG. 13 is a graph showing a relationship between clothes surface temperature and thermal feeling, according to the first embodiment of the present invention.

In the first embodiment of the present invention, the thermal feeling is estimated using the clothes surface temperature Tir based on the strong relationship between the clothes surface temperature Tir and the thermal feeling of the passenger M. This relationship, as shown in FIG. 13, has been found by many feeling tests performed by the present inventors. As shown in FIG. 13, further, it has been also founded by the inventors that the solar radiation intensity affects the thermal feeling. The clothes portion of the passenger M has a larger area than a face portion thereof, and a movement distance (movement amount) of the clothes portion is smaller than that of the face portion in a seated condition. Therefore, irrespective of movement, a physique, a seating posture and the like of the passenger M, the clothes portion hardly deviates from the temperature detection range of the surface temperature sensor 3.

Accordingly, the thermal feeling of the passenger M can be always accurately estimated using the clothes surface temperature Tir, thereby always realizing comfortable air-conditioning control.

(Second Embodiment)

In the above-described first embodiment, clothes amount information is inputted by the passenger M using the clothes amount setting switch 41, and the clothes-amount correction coefficient Cclo is obtained from the clothes amount information. In the second embodiment of the present invention, however, a clothes-amount correction coefficient Cclo' is obtained from the outside air temperature Tam.

Figure 14:
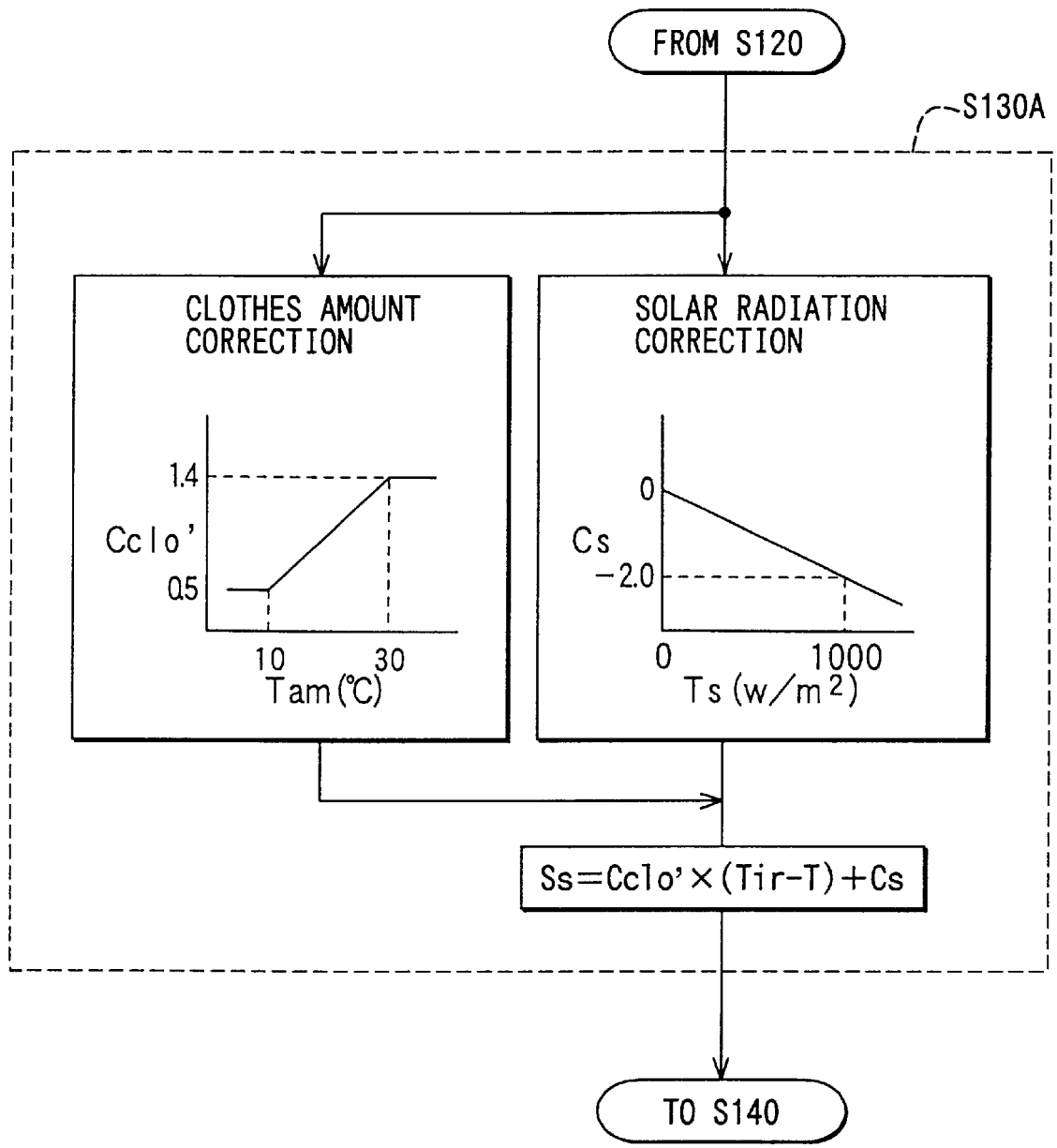
FIG. 14 is a flow diagram showing a control processing according to a second preferred embodiment of the present invention.

In the second embodiment of the present invention, the clothes amount setting switch 41 described in the first embodiment is eliminated, and step S130 of the first embodiment is changed to step S130A shown in FIG. 14. The other parts in the second embodiment are identical to those in the first embodiment, respectively.

In the second embodiment, the clothes of the passenger M is set to become lighter as the outside air temperature Tam becomes higher, and the clothes amount correction coefficient Cclo' is obtained from the outside air temperature Tam as shown at step S130A in FIG. 14. Then, the thermal-feeling estimation value Ss is calculated using the following formula (5) stored in the ROM 30b based on the clothes amount correction coefficient Cclo' and the like, thereby estimating the thermal feeling of the passenger M.

$$Ss=Cclo'\times(Tir-T)+Cs \quad (5)$$

Although the clothes amount correction coefficient Cclo' is linearly changed in the outside air temperature Tam from 10° C. to 30° C. in the second embodiment, it can be changed in step.

As shown in FIG. 14, in the second embodiment of the present invention, the clothes amount correction coefficient Cclo' is constant in the outside air temperature Tam lower than 10° C. and higher than 30° C. in the second embodiment. However, the clothes amount correction coefficient Cclo, can be suitably changed even in the outside air temperature Tam lower than 10° C. and higher than 30° C.

In the above-described first and second embodiments of the present invention, the clothes amount correction coefficient is obtained from the clothes amount or the outside air temperature Tam, respectively. However, thermal capacity of the clothes is obtained from a changing rate of the clothes surface temperature Tir, and an clothes amount is obtained from the thermal capacity, so that the clothes amount correction coefficient can be obtained from the clothes amount. Specifically, when the clothes is set to become heavier as the capacity of the clothes becomes larger, the clothes amount correction coefficient Cclo' is made smaller as the capacity becomes larger (heavier clothes).

(Third Embodiment)

Figure 15:
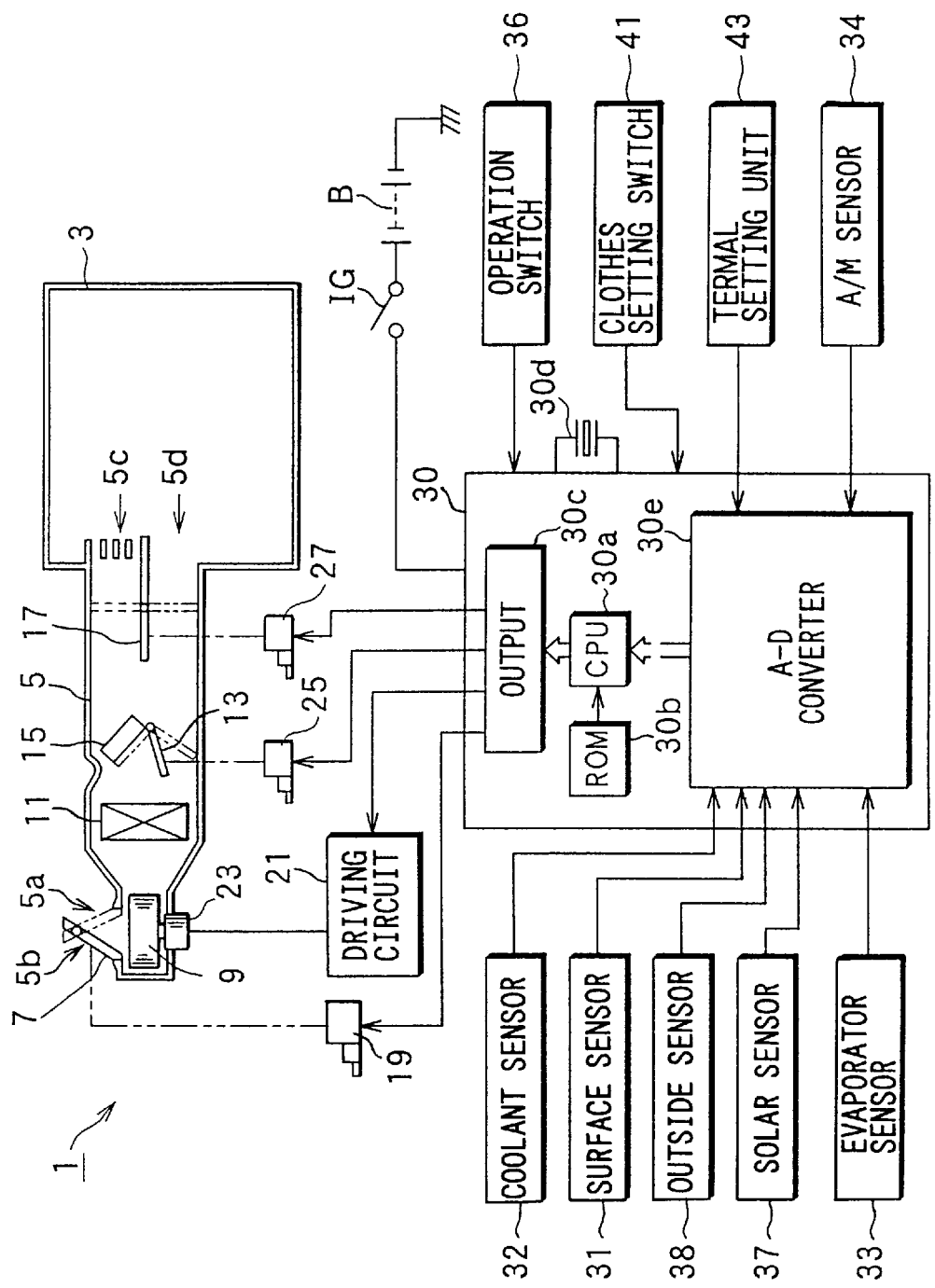
FIG. 15 is a schematic diagram showing an entire construction of a vehicle air conditioner according to a third preferred embodiment of the present invention.
Figure 16:
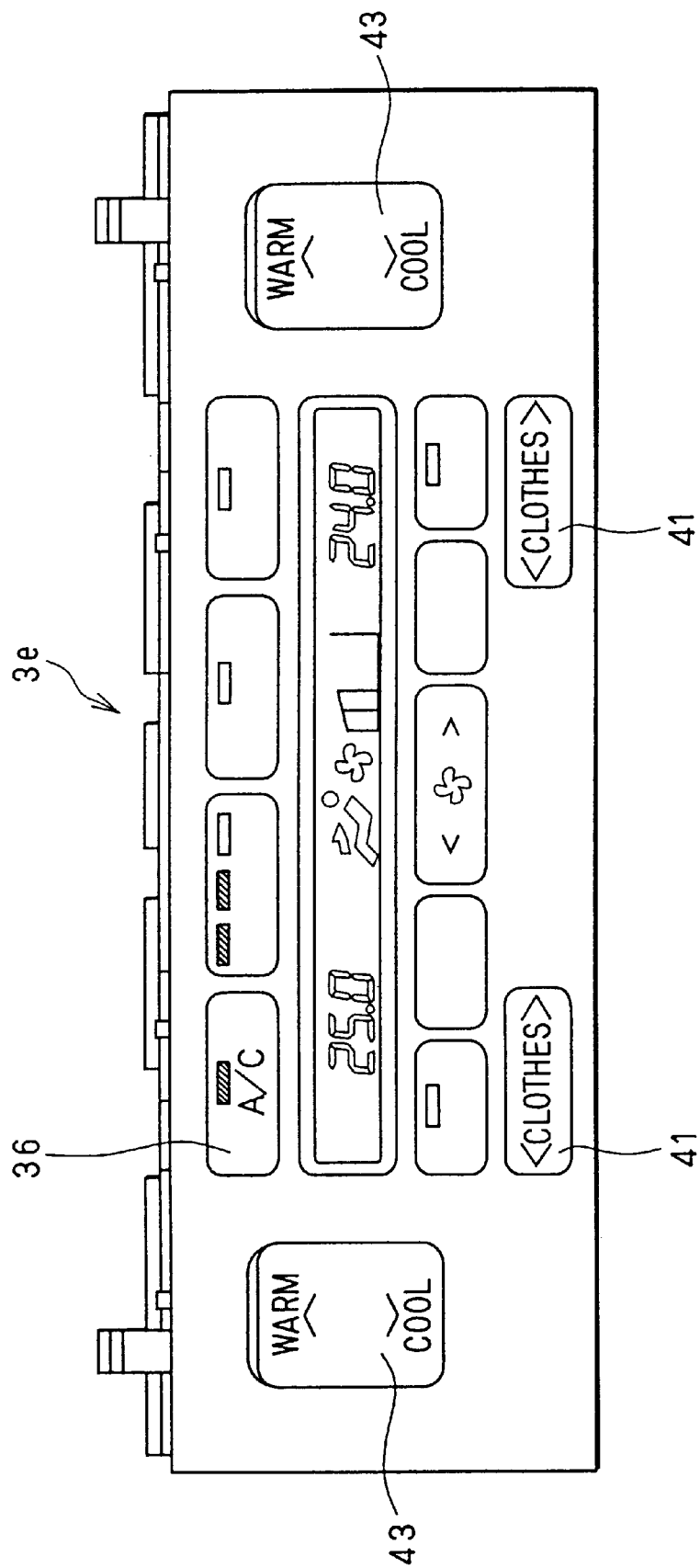
FIG. 16 is a front view showing an operation panel according to the third embodiment.
Figure 17:
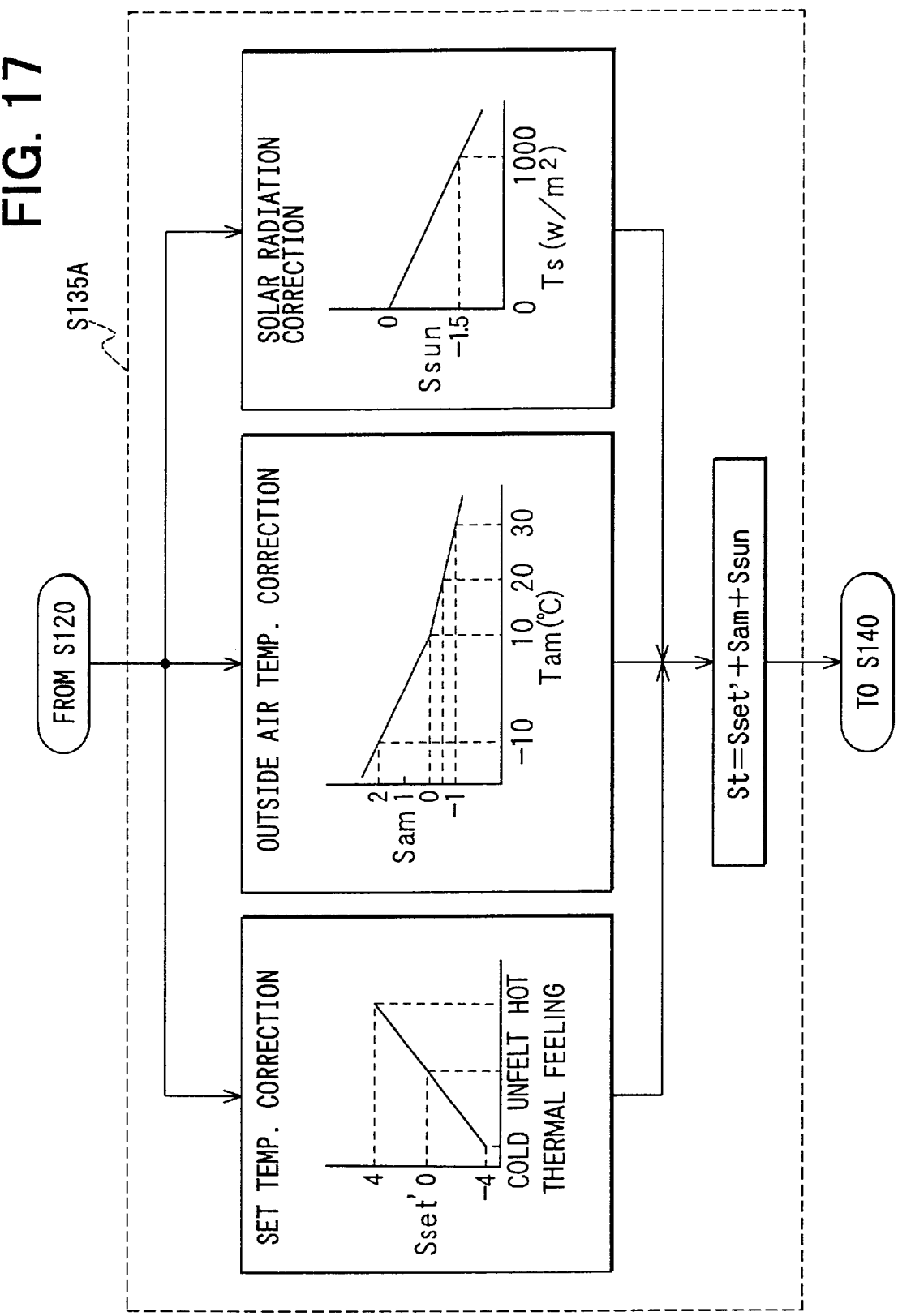
FIG. 17 is a flow diagram showing a control processing according to the third embodiment.

The third embodiment of the present invention will be now described with reference to FIGS. 15–17. In the above-described first embodiment of the present invention, preference temperature of the passenger is set using the temperature setting unit 35. However, in the third embodiment, the preference thermal feeling of the passenger (thermal feeling information) is set using a thermal feeling setting unit 43 shown in FIGS. 15, 16. According to this change in the third embodiment, step S135 in the first embodiment is changed to step S135A shown in FIG. 17. The other parts in the third embodiment are identical to those in the first embodiment, respectively.

By using the thermal feeling setting unit 43 of the third embodiment, the thermal feeling can be set at plural thermal feeling steps from a cold feeling step to a hot feeling step. As shown in FIG. 17, a set thermal-feeling correction value Sset' is obtained in accordance with the preference thermal feeling set by the passenger using the thermal feeling setting unit 43. Further, the outside temperature correction value Sam and the solar radiation correction value Ssun are obtained in accordance with the outside air temperature Tam and the solar radiation intensity Ts, respectively. Then, the thermal feeling target value St is calculated using the following formula (6) based on the correction values Sset', Sam, Ssun.

$$St = Sset' + Sam + Ssun \tag{6}$$

In the third embodiment of the present invention, air-conditioning control is performed so as to reflect the preference thermal feeling of the passenger, thereby realizing comfortable air-conditioning control coinciding with the preference thermal feeling.

In the third embodiment of the present invention, the thermal feeling is set at the plural thermal feeling steps by the thermal feeling setting unit 43. However, plural thermal feeling selection switches (e.g., a cold selection switch, a cool selection switch, a warm selection switch, a hot selection switch and the like) can be provided, and the preference thermal feeling (thermal feeling information) can be set by selecting one of these plural selection switches.

(Fourth Embodiment)

Figure 18:
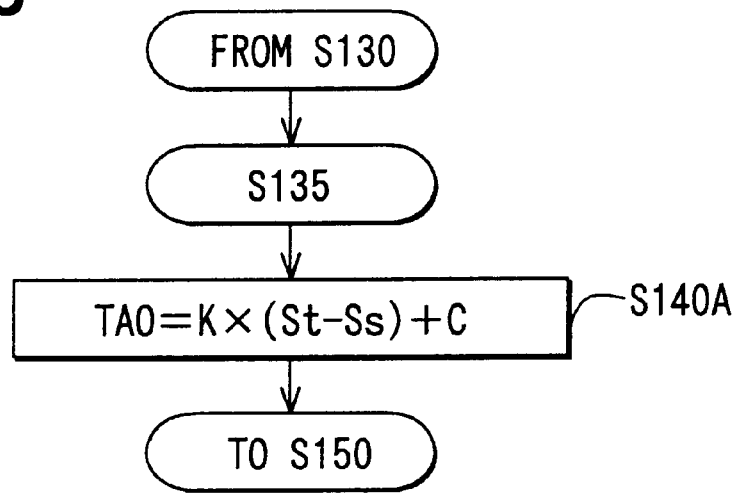
FIG. 18 is a flow diagram showing a control processing according to a fourth preferred embodiment of the present invention.

The fourth embodiment of the present invention will be now described with reference to FIG. 18. In the fourth embodiment, step S140 described in the first embodiment, where the target air temperature TAO is calculated, is changed to step S140A shown in FIG. 18. The other parts in the fourth embodiment are identical to those in the first embodiment, respectively.

In the fourth embodiment, the target air temperature TAO is calculated using the following formula (7) stored in the ROM 30b, where the correction terms of the outside air temperature Tam and the solar radiation intensity Ts are eliminated so as to simplify the TAO calculation.

$$TAO = K \times (St - Ss) + C \tag{7}$$

In the fourth embodiment, the air-conditioning control is performed so that the thermal-feeling estimation value Ss coincides with the thermal feeling target value St, thereby realizing the air-conditioning control comfortable for the passenger M.

(Fifth Embodiment)

Figure 19:
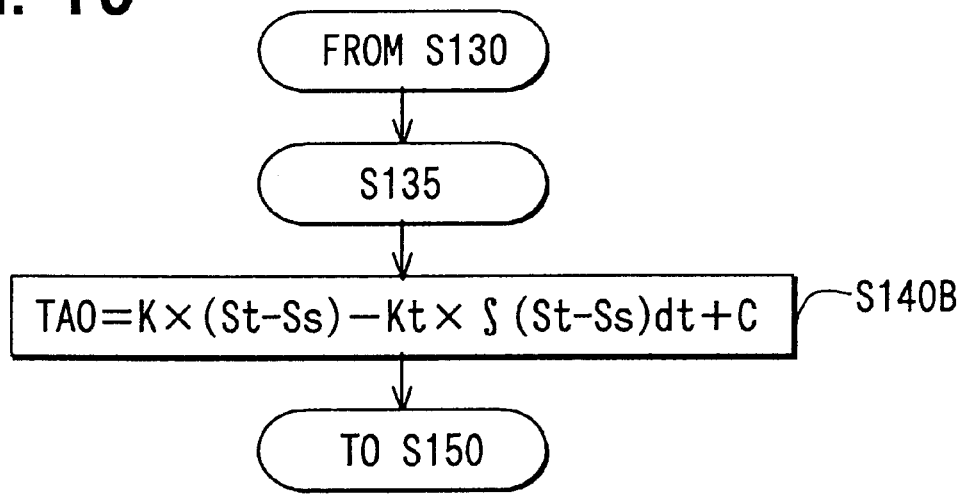
FIG. 19 is a flow diagram showing a control processing according to a fifth preferred embodiment of the present invention.

The fifth embodiment of the present invention will be now described with reference to FIG. 19. In the fifth embodiment of the present invention, step S140 (refer to FIG. 9) in the first embodiment is changed to step S140B as shown in FIG. 19. The other parts in the fifth embodiment are identical to those in the first embodiment, respectively.

In the fifth embodiment, the target air temperature TAO is calculated using the following formula (8) stored in the ROM 30b. In the formula (8), an integral term is added to the TAO calculation formula in the fourth embodiment, and a proportional integral control (PI control) is performed, thereby improving control stability.

$$TAO = K \times (St - Ss) - Kt \times \int (St - Ss) dt + C \tag{8}$$

wherein, Kt indicates a coefficient of the integral term.

(Sixth Embodiment)

Figure 20:
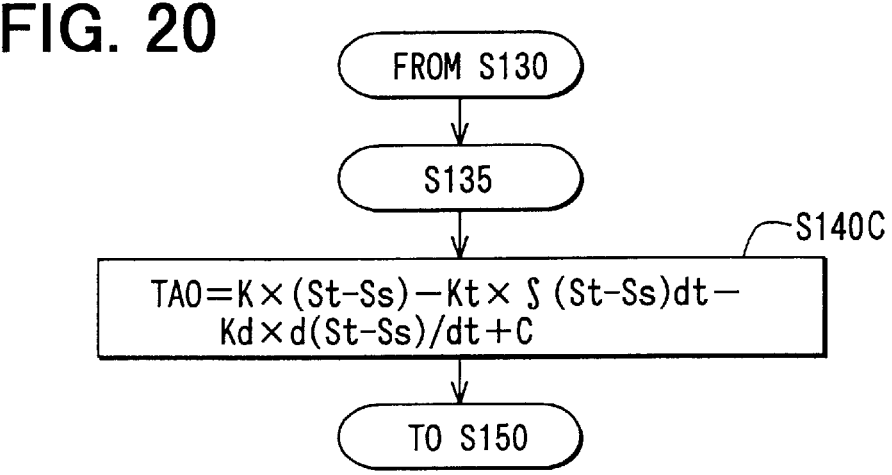
FIG. 20 is a flow diagram showing a control processing according to a sixth preferred embodiment of the present invention.

The sixth embodiment of the present invention will be now described with reference to FIG. 20. In the sixth embodiment, step S140 (refer to FIG. 9) in the first embodiment is changed to step S140C shown in FIG. 20. The other parts in the sixth embodiment are identical to those in the first embodiment, respectively.

In the sixth embodiment, the target air temperature TAO is calculated by the following formula (9) stored in the ROM 30b. In the formula (9), a differential term is added to the TAO calculation formula described in the fifth embodiment, and the proportional integral and derivative control (PID control) is performed, thereby improving control stability and reducing convergence time.

$$TAO = K \times (St - Ss) - Kt \times \int (St - Ss) dt - Kd \times d(St - Ss)/dt + C \tag{9}$$

wherein, Kd indicates a coefficient of the differential term.

(Seventh Embodiment)

Figure 21:
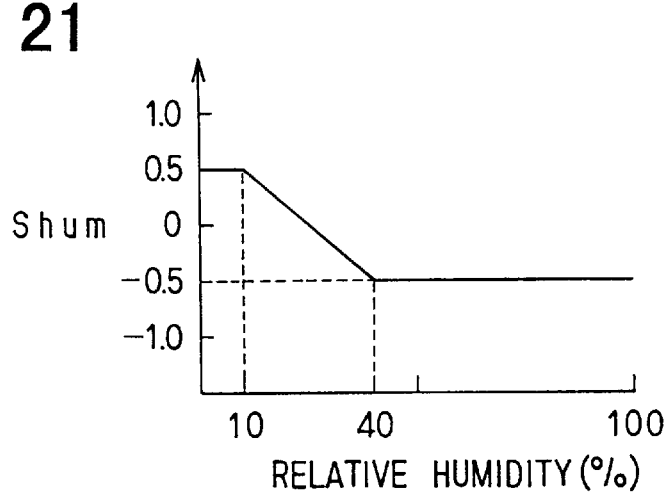
FIG. 21 is a characteristic graph for obtaining a humidity correction value in a seventh preferred embodiment of the present invention.

The seventh embodiment of the present invention will be now described with reference to FIG. 21. In the above-described first embodiment, the thermal feeling target value St is calculated using the set temperature Tset, the outside air temperature Tam and the solar radiation intensity Ts. However, since the thermal feeling, which is comfortable for the passenger, is changed in accordance with relative humidity, relative humidity is inputted as a vehicle environmental condition relative the thermal feeling of the passenger, and the thermal feeling target value St can be calculated while the relative humidity is considered. Specifically, a humidity correction value Shum is obtained from the characteristic map in FIG. 21, stored in the ROM 30b, and the thermal feeling target value St is calculated using a formula (St=Sset+Sam+Ssun+Shum). In the seventh embodiment, the other parts are similar to those of the above-described first embodiment.

(Eighth Embodiment)

The eighth embodiment of the present invention will be now described with reference to FIG. 22. The clothes surface temperature Tir is changed in accordance with the clothes amount even when the inside air temperature and the solar radiation intensity are not changed. That is, when inside air temperature is lower than body temperature of a passenger, the clothes surface temperature Tir becomes higher due to the body temperature of the passenger as the clothes of the passenger becomes lighter. In the above first embodiment, therefore, the thermal-feeling estimation value Ss, including the clothes surface temperature Tir in the calculation formula, is changed in accordance with a change of the clothes amount even when the inside air temperature and the solar radiation intensity are not changed. In addition, in the first embodiment, since the target air temperature TAO is calculated by a difference between the thermal-feeling target value St and the thermal-feeling estimation value Ss and the like, the target air temperature is also changed in accordance with the clothes amount, thereby sometimes not realizing air-conditioning control that is comfortable for the passenger M.

Figure 22:
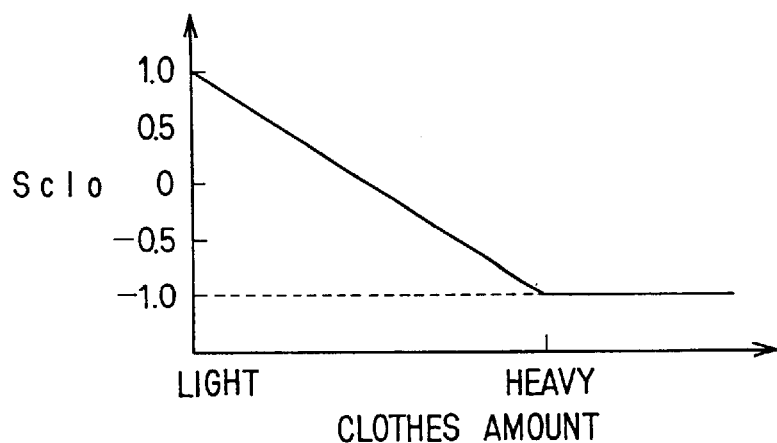
FIG. 22 is a characteristic graph for obtaining a clothes amount correction value in an eighth preferred embodiment of the present invention.

In the eighth embodiment of the present invention, therefore, the clothes amount correction value Sclo is obtained from the characteristic map shown in FIG. 22 stored in the ROM 30b, and the thermal feeling target value St is calculated using a formula (St=Sset+Sam+Ssun+Sclo). Accordingly, the changed portion of the thermal-feeling estimation value Ss due to the clothes amount can be canceled, and the target air temperature TAO can be suitably set, thereby realizing air-conditioning control that is felt by the passenger M to be comfortable.

(Ninth Embodiment)

Figure 23:
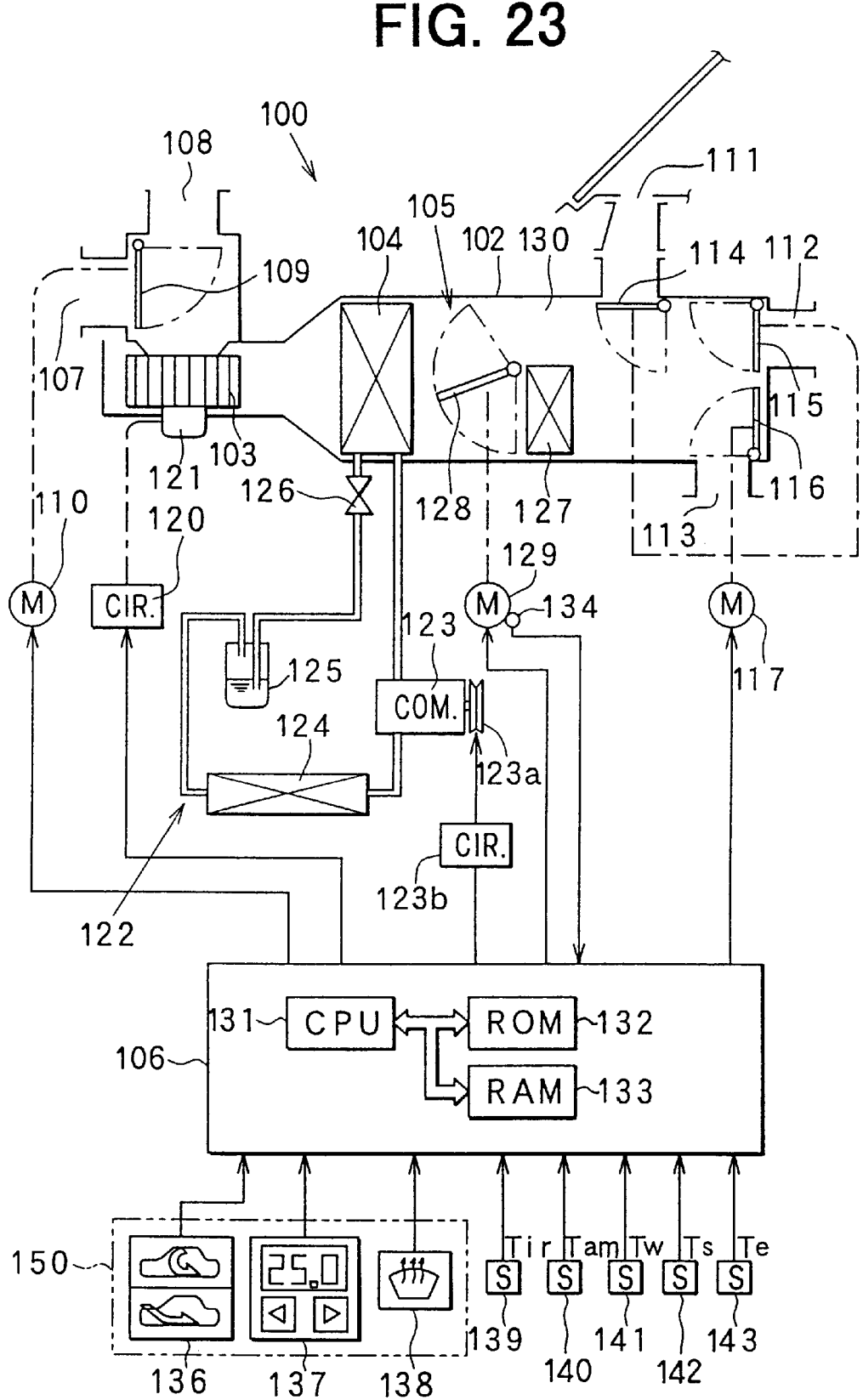
FIG. 23 is a schematic diagram showing an entire construction of a vehicle air conditioner according to a ninth preferred embodiment of the present invention.

The ninth embodiment of the present invention will be now described with reference to FIGS. 23–30. As shown in FIG. 23, a vehicle air conditioner 100 includes an air duct 102 through which air flows toward the passenger compartment, a blower 103 for blowing air toward the passenger compartment through the air duct 102, an evaporator 104 for cooling air flowing in the air duct 102, an air temperature adjusting unit 105 of an air mixing type for adjusting temperature of air blown into the passenger compartment, and an electronic control unit (ECU) 106 for controlling each air-conditioning member.

The air duct 102 is disposed in the passenger compartment at a front side, an inside air introduction port 107 and an outside air introduction port 108 are provided in the air duct 102 at a most upstream air side. An inside/outside air switching damper 109 are rotatably disposed inside the inside air introduction port 107 and the outside air introduction port 108. The inside/outside air switching damper 109 is driven by a servomotor 110. The inside/outside air switching damper 109 is disposed to switch one of an inside air circulation mode (inside air introduction mode) where air inside the passenger compartment (inside air) is introduced from the inside air introduction port 107, and an outside air circulation mode (outside air introduction mode) where air outside the passenger compartment (outside air) is introduced from the outside air introduction port 108.

Plural air outlets are provided in the air duct 102 at a downstream air side. The plural air outlets include a defroster air outlet 111 from which conditioned air is blown toward a windshield, a face air outlet 112 from which conditioned air is blown toward the upper half body of the passenger and a foot air outlet 113 from which conditioned air is blown toward the lower half body (foot area) of the passenger.

A defroster damper 114, a face damper 115 and a foot damper 116 are rotatably provided at upstream air sides of these air outlets 111–113, respectively. These defroster damper 114, face damper 115 and foot damper 116 are driven by a common servomotor 117 through a link mechanism (not shown).

A revolution speed of the blower 103 is controlled by a blower motor 121 to which voltage controlled by a blower driving circuit 120 is applied. The blower 103 introduces air from the inside air introduction port 107 and/or the outside air introduction port 108, and blows introduced air into the passenger compartment through the air duct 102.

The evaporator 104, disposed in the air duct 102 at a downstream air side of the blower 103, is a cooling heat exchanger for cooling air blown by the blower 103, and it is one of components constituting a refrigerant cycle system 122.

The refrigerant cycle system 122 is constructed so that refrigerant circulates through a compressor 123, a condenser 124, a receiver 125, an expansion valve 126 and the evaporator 104. The compressor 123 is driven by a vehicle engine (not shown) through a solenoid clutch 123a.

In the refrigerant cycle system 122, air-cooling operation of the evaporator 104 is performed by operation of the compressor 123, and the air-cooling operation is stopped by stopping the operation of the compressor 123.

In the ninth embodiment, the air temperature adjusting unit 105 includes a heater core 127, an air mixing damper 128 and the like. The heater core 127 is a heating heat exchanger for heating air using cooling water (hot water) of the vehicle engine as a heat source. The heater core 127 is disposed at a downstream air side of the evaporator 104 to heat cool air having passed through the evaporator 104.

The air mixing damper 128 is rotatably disposed at an upstream air side of the heater core 127. The air mixing damper 128 adjusts an amount of air (hot air amount) passing through the heater core 127 and an amount of air (cool air amount) passing through a bypass passage 130 while bypassing the heater core 127 in accordance with its open degree set by a servomotor 129.

The ECU 106 includes a central processing unit (CPU) 131, a read only memory (ROM) 132, a random access memory (RAM) 133 and the like. Control programs for air-conditioning control in the passenger compartment is stored in the ROM 132, and the ECU 106 performs each operation and each processing based on the stored control programs.

The above servomotors 110, 129, 117 are electrically connected to an output side of the ECU 106, and a revolution speed of the blower motor 121 is controlled by the blower driving circuit 120. An air-mixing open degree sensor 134, for detecting an open degree θ of the air mixing damper 128, is provided in the servomotor 129, and is electrically connected to an input side of the ECU 106.

The solenoid clutch 123a of the compressor 123 is electrically connected to the output side of the ECU 106 through a compressor driving circuit 123b, and the solenoid clutch 123a becomes to a connection condition by energizing a coil of the solenoid clutch 123a. Thus, the rotational force of the engine is transmitted to the compressor 123, thereby driving the compressor 123.

An inside/outside air changing switch 136, a temperature setting switch 137, a defroster mode setting switch 138 and the like, provided on an instrument panel (not shown) provided in the passenger compartment at a front side of the driver seat, are connected to the input side of the ECU 106. Further, a surface temperature sensor (i.e., non-contact temperature sensor) 139, an outside air temperature sensor 140, a water temperature sensor 141, a solar radiation sensor 142 and an evaporator temperature sensor 143 are connected to the input side of the ECU 106.

The surface temperature sensor 139 detects surface temperature Tir' of a passenger (specifically, a driver) in a non-contact state, and a signal of the detected temperature is inputted into the ECU 106. Specifically, the surface temperature sensor 139 is constructed by an infrared sensor, and is disposed in or around an air-conditioning operation panel 150 located in the instrument panel, for example. This infrared sensor detects a change of infrared ray intensity due to a change of surface temperature mainly at an upper half body of the passenger in a non-contact state. The infrared sensor uses a thermopile detector for generating electromotive force in accordance with a change of infrared ray intensity.

The surface temperature sensor 139 detects the surface temperature of the passenger, and the surface temperature is influenced by inside air temperature in the passenger compartment. Therefore, the surface temperature detected by the surface temperature sensor 139 includes information corresponding to a change of inside air temperature. In this example, therefore, an inside air temperature is eliminated.

The outside air temperature sensor 140 detects temperature (outside air temperature) Tam outside the passenger compartment, and the water temperature sensor 141 detects temperature (water temperature) Tw of hot water from the vehicle engine. The evaporator temperature sensor 143 detects temperature (evaporator temperature) Te of air blown from the evaporator 104, and the solar radiation sensor 142 detects intensity (solar radiation intensity) Ts of solar radiation entering into the passenger compartment. Signals of the outside air temperature Tam, the water temperature Tw, the evaporator temperature Te and the solar radiation intensity Ts from the sensors 140–143 are also inputted to the ECU 106.

Next, on operation of the vehicle air conditioner according to the ninth embodiment will be now described with reference to the flow diagram shown in FIG. 24.

When a power switch is turned on, the ECU 106 starts a control program, and it performs operation and processing in accordance with the flow diagram.

At step S310, various kind of counters, control flags and the likes are initialized. Then, at step S320, a signal of a set temperature Tset from the temperature setting switch 137 is read, and it is stored in the RAM 133.

At step S330, signals from various kinds of sensors are read in order to detect an environmental condition affecting an air-conditioned state in the passenger compartment. That is, a signal of the passenger surface temperature Tir from the surface temperature sensor 139, a signal of the outside air temperature Tam from the outside air temperature sensor 140, a signal of the water temperature Tw from the water temperature sensor 141, a signal of the solar radiation intensity Ts from the solar radiation sensor 142 and a signal of the evaporator temperature Te from the evaporator temperature sensor 143 are read, and they are stored in the RAM 133.

At step S340, the target air temperature TAO to be blown into the passenger compartment is calculated using the following formula (10). The target air temperature TAO is a target air temperature required to maintain temperature of the passenger compartment at the set temperature Tset irrespective of a change of the vehicle environmental condition (air-conditioning heat load condition).

$$TAO = Kset \times Tset - Kir \times Tir - Kam \times Tam - Ks \times Ts + C \quad (10)$$

wherein, Kset indicates a set temperature correction coefficient, Kir indicates a passenger surface temperature coefficient, Kam indicates an outside temperature correction coefficient, Ks indicates a solar radiation correction coefficient, and C indicates a correction constant.

At step S350, an air blowing amount of the blower 103 is set based on the above target air temperature TAO. Specifically, a blower voltage BLW applied to the blower motor 121 through the blower driving circuit 120 is determined by a later-described method.

At step S360, a target open degree θ0 of the air mixing damper 128 is calculated using the following formula (11).

$$\theta 0 = [(TAO - Te)/(Tw - Te)] \times 100 (\%) \quad (11)$$

At step S370, the inside air introduction mode or the outside air introduction mode is determined based on the target air temperature TAO, as an air introduction mode.

Specifically, the inside air introduction mode, where the inside air introduction port 107 is entirely opened and the outside air introduction port 108 is entirely closed by the inside/outside air switching damper 109, is selected in a range (maximum cooling range) where the target air temperature TAO becomes equal to or lower than a predetermined temperature. When the target air temperature TAO becomes higher than the predetermined temperature, the outside air introduction mode, where the inside air introduction port 107 is entirely closed and the outside air introduction port 108 is entirely opened by the inside/outside air switching damper 109, is selected.

Further, an inside/outside air mixing mode for introducing outside air and inside air can be set between the inside air introduction mode and the outside air introduction mode.

At step S380, intermittent operation control of the compressor 123 is performed by energizing and de-energizing the coil of the solenoid clutch 123a. Specifically, when the actual evaporator temperature Te is higher than an evaporator target temperature TEO, the compressor 123 is operated by energizing the solenoid clutch 123a. When the actual evaporator temperature Te is lower than the evaporator target temperature TEO, the operation of the compressor 123 is stopped by de-energizing the solenoid clutch 123a. The actual evaporator temperature Te is maintained at the evaporator target temperature TEO using such intermittent operation control of the compressor 123.

At step S390, an air outlet mode is determined based on the target air temperature TAO. At step S410, the control signals determined at the above steps 350–390 are output to the blower driving circuit 120, the servomotors 110, 117, 129, the compressor driving circuit 123b and the like, thereby controlling operation of the blower 103, the mode switching dampers 114–116 and the compressor 123.

At step S411, it is determined whether a control cycle time τ passes after processing of step S410 is performed. After the control cycle time τ passes, the control routine returns to step S320. The above operation and processing are repeated, so that the operation of the vehicle air conditioner 101 is automatically controlled.

Next, detail description will be made on a specific example of an air outlet mode determination at step S390 with reference to FIG. 25. At step S391, as shown in FIG. 26, a normal air outlet mode in an air-conditioning stationary operation is calculated based on the target air temperature TAO. A characteristic map (control map) for the air outlet mode determination, shown in FIG. 26, is stored in the ROM 132. In this example, as shown in FIG. 26, as the target air temperature TAO increases, the air outlet mode is automatically changed from a face mode (FACE) to a foot mode (FOOT) through a bi-level mode (B/L) in this order. In FIG. 26, for example, TAO0, TAO1, TAO2 and TAO3 indicate 25° C., 30° C., 35° C. and 40° C., respectively.

In the face mode (first mode), the face air outlet 112 is opened by the face damper 115, the foot air outlet 113 is closed by the foot damper 116, and the defroster air outlet 111 is closed by the defroster damper 114. Thus, conditioned air is blown to the upper half body side of the passenger only from the face air outlet 112.

In the bi-level mode (first mode), the face air outlet 112 is opened by the face damper 115, the foot air outlet 113 is opened by the foot damper 116, and the defroster air outlet 111 is closed by the defroster damper 114. Thus, conditioned air is blown to both of the upper half body side and the lower half body side of the passenger from both of the face air outlet 112 and the foot air outlet 113 at the same time.

In the foot mode (second mode), the face air outlet 112 is closed by the face damper 115, the foot air outlet 113 is entirely opened by the foot damper 116, and the defroster air outlet 111 is opened at a small open degree by the defroster damper 114. Thus, conditioned air is blown mainly to the lower half body side of the passenger from the foot air outlet 113, and a small amount of the conditioned air is blown to the inside of the windshield in the passenger compartment from the defroster air outlet 111 at the same time.

Figure 27:
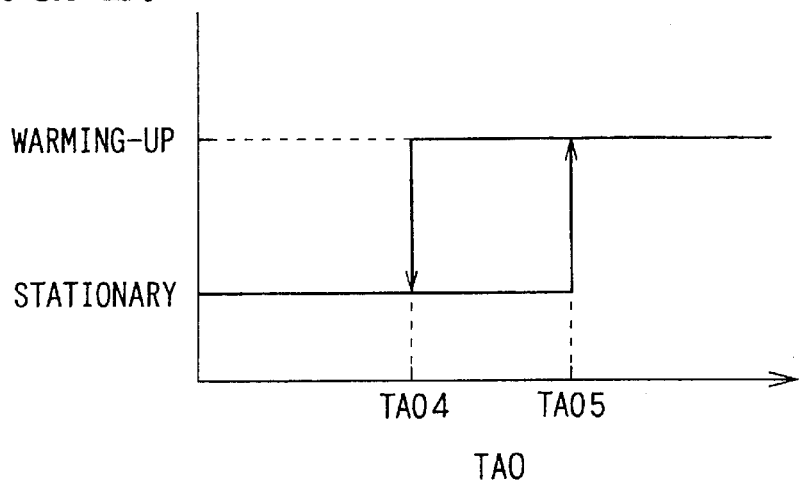
FIG. 27 is a characteristic graph showing a relationship between the target air temperature and a warming-up control operation in the ninth embodiment.

At step S392, it is determined whether air-conditioning operation is performed in a warming-up control operation condition. As shown in FIG. 27, the determination of the warming-up condition is performed based on the target air temperature TAO. The characteristic map (control map) shown in FIG. 27, is stored in the ROM 132. The target air temperature TAO is calculated to be higher than a predetermined temperature TAO5 in an environmental condition (high heat load condition) such as a time of starting heating operation at low outside air temperature in winter. After heating operation is started, temperature in the passenger compartment increases, and the surface temperature Tir detected by the surface temperature sensor 139 increases. At this time, the target air temperature TAO decreases gradually.

The target air temperature TAO decreases as time passes after heating operation is started. Therefore, at step S392, when the target air temperature TAO is higher than the is predetermined temperature TAO5, it is determined to be in the warming-up condition. When the target air temperature TAO is lower than the predetermined temperature TAO4, it is determined not to be in the warming-up condition, that is, it is determined to be in a stationary control condition. At this air-conditioning stationary time, the normal air outlet mode calculated at step S391 is finally determined as an output air outlet mode. For example, the predetermined temperatures TAO4, TAO5 are 25° C., 30° C., respectively.

When the warming-up condition is determined at step S392, it is determined whether the water temperature Tw is higher than a predetermined temperature Two (e.g., 60° C.) at step S393. At an initial time of warming-up control operation, the temperature of conditioned air blown into the passenger compartment is low. In this case, when conditioned air is blown to the upper half body side of the passenger from the face air outlet 112, cool air is blown to the passenger, thereby making air-conditioning feeling uncomfortable. Accordingly, at step S393 in FIG. 25, it is determined using the water temperature Tw whether air temperature of conditioned air is low at the initial time of the warming-up control operation.

Specifically, when the water temperature Tw is lower than the predetermined temperature Two, it is determined to be the initial time of the warming-up control operation, and the normal air outlet mode calculated at step S391 is finally determined as the output air outlet mode. When the water temperature Tw is lower than the predetermined temperature Two, the target air temperature becomes higher than the predetermined temperature TAO3 in FIG. 26. Therefore, the foot mode is selected, and it is prevented air-conditioning feeling from becoming uncomfortable due to cool air blown from the face air outlet 112.

On the other hand, when the water temperature Tw is equal to or higher than the predetermined temperature Two, the air outlet mode is determined based on the passenger's surface temperature Tir at step S394. That is, at step S394, when the passenger's surface temperature Tir is lower than a predetermined temperature Tir1, the bi-level mode (B/L) is selected. When the passenger's surface temperature Tir is higher than a predetermined temperature Tir2, the foot mode is selected. For example, the predetermined temperatures Tir1, Tir2 are 15° C., 20° C., respectively.

In the warming-up control operation condition, the air outlet mode is directly switched between the bi-level mode (first mode) and the foot mode (second mode) independently using the passenger's surface temperature Tir' detected by the surface temperature sensor 139. Therefore, the following advantages are obtained when the mode determination at step S394 is actually used.

First, since the passenger's surface temperature Tir is an information having a high correlation with the thermal feeling of the passenger, the air outlet mode can be switched between the bi-level mode and the foot mode in the warming-up control operation condition at a suitable time corresponding to the thermal feeling of the passenger.

That is, when the passenger's surface temperature Tir is lower than the predetermined temperature Tir2, it is in a cool condition in which the passenger does not feel sufficiently warm. Therefore, hands of the driver or the likes can be rapidly heated by warm air blown from the face air outlet 112 in the bi-level mode, thereby improving heating feeling for the passenger.

When the passenger's surface temperature Tir becomes higher than the predetermined temperature Tir2, the passenger feels hot due to hot air blown from the face air outlet 112. At this time of Tir>Tir2, therefore, the air outlet mode is switched from the bi-level mode to the foot mode. Thus, hot feeling can be beforehand restricted from being uncomfortable by stopping to blow hot air from the face air outlet 112 at a suitable time before the passenger feels the hot feeling. Accordingly, comfortable heating feeling can be given to the passenger in an entire period from the initial time of warming-up control operation to the stationary time.

In addition, because the switching of the bi-level mode and the foot mode in the warming-up control operation condition can be suitably performed by using the passenger's surface temperature Tir, the control structure of the ECU can be simplified.

In the ninth embodiment of the present invention, in accordance with a high relationship between the passenger's surface temperature Tir and the thermal feeling of the passenger, the above mode switching can be suitably performed using one surface temperature sensor 39 without increasing the number of sensors. Therefore, construction of the ECU can be made simple and the vehicle air conditioner is manufactured in cost low.

Figure 25:
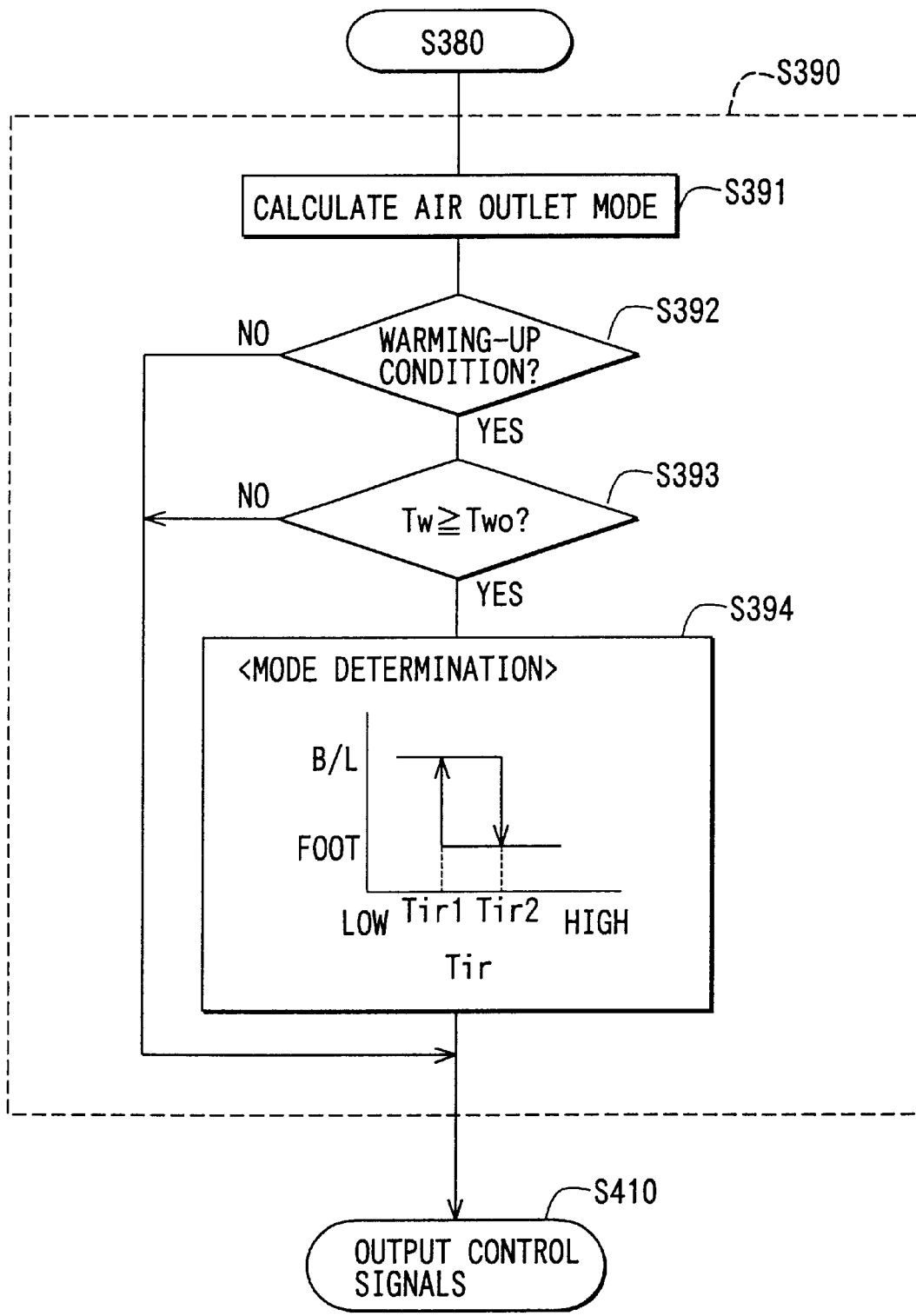
FIG. 25 is a flow diagram showing a specific example of determining an air outlet mode according to the ninth embodiment.
Figure 26:
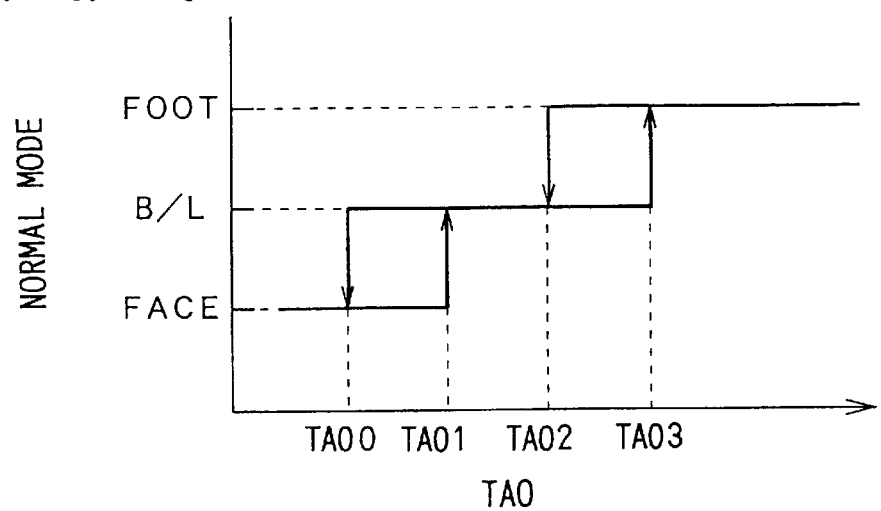
FIG. 26 is a characteristic graph showing a relationship between an air outlet mode (normal mode) and a target air temperature (TAO) in the ninth embodiment.

In the flow diagram shown in FIG. 25 of the ninth embodiment, when the foot mode calculated at step S391 is selected as the air outlet mode in the initial time of the warming-up control operation, the foot mode can be switched to the bi-level mode based on not the passenger's surface temperature Tir but the water temperature Tw. This reason is as follows.

For example, when a passenger rides in a vehicle from a room heated at high temperature, the passenger's surface temperature Tir is high due to the high-temperature room. In this case, when the foot mode is switched to the bi-level mode based on the passenger surface temperature Tir, the bi-level mode is selected even in a case where the foot mode should be originally selected, so that uncomfortable feeling is given to the passenger by blowing low-temperature conditioned air. However, the foot mode is switched to the bi-level mode at the initial time of the warming-up control operation based on the water temperature Tw corresponding to the temperature of conditioned air, thereby avoiding generation of the above uncomfortable feeling.

Figure 24:
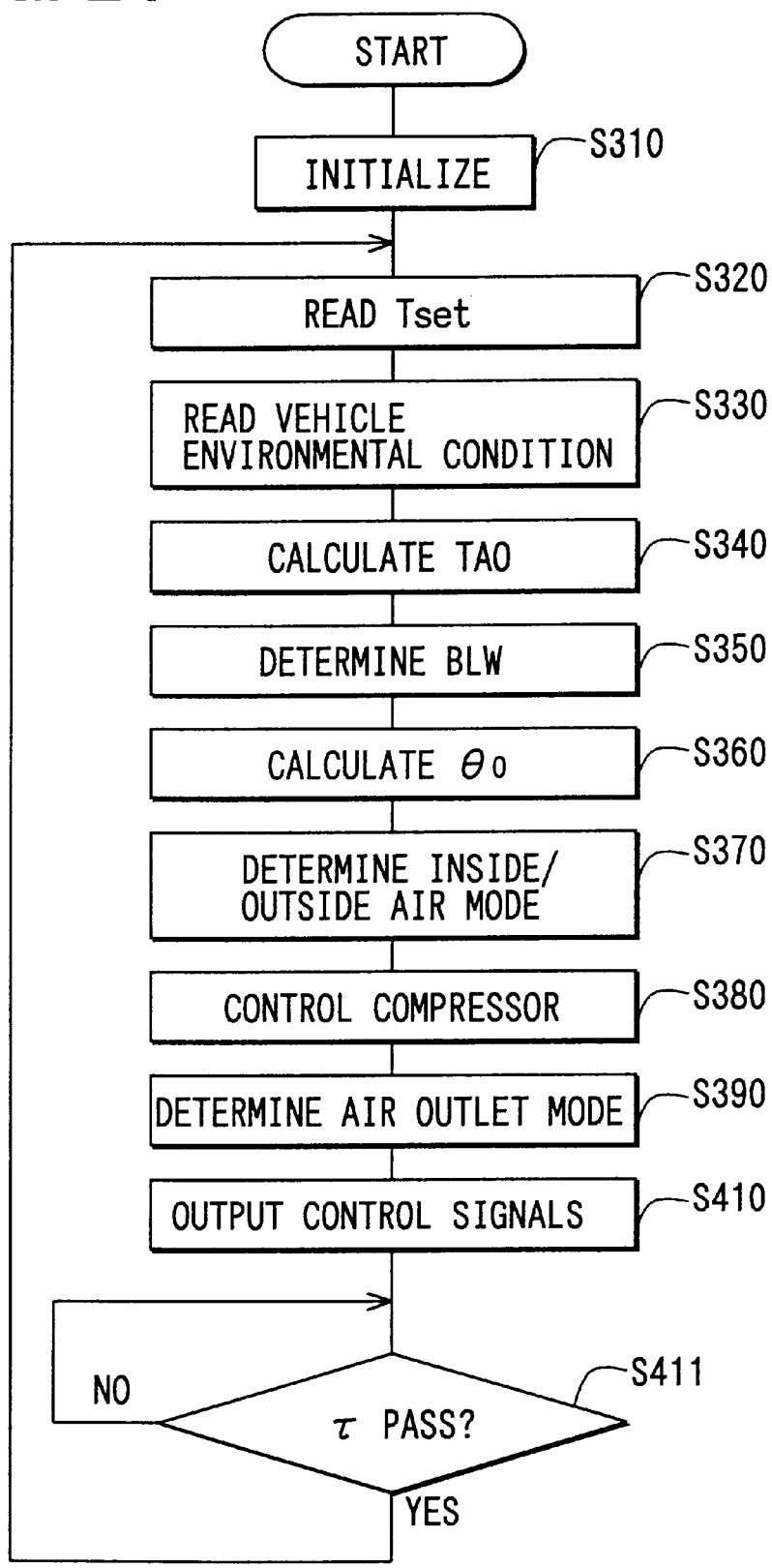
FIG. 24 is a flow diagram showing an air-conditioning control according to the ninth embodiment.

Next, the blower voltage BLW at step S350 shown in FIG. 24 will be now described in detail.

Figure 28:
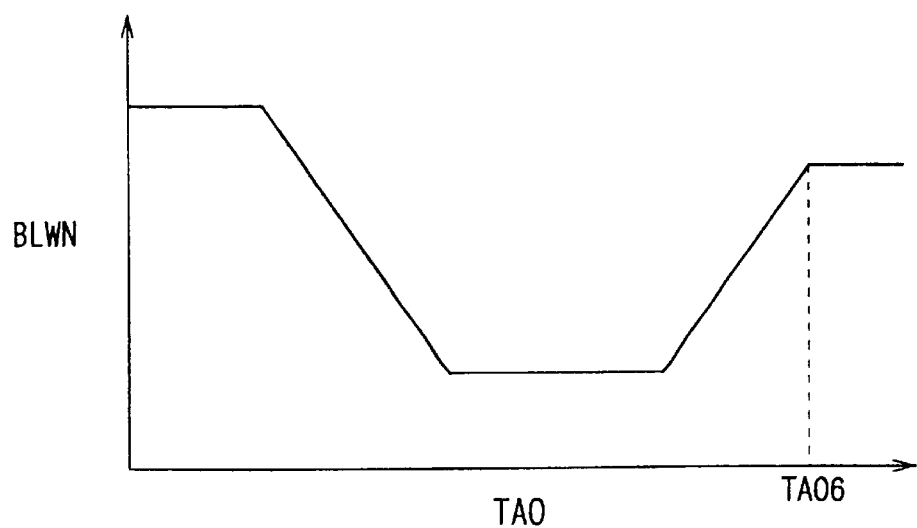
FIG. 28 is a characteristic graph showing a relationship between the target air temperature and a blower voltage (BLWN) in the ninth embodiment.

At the stationary time, a blower voltage BLWN applied to the blower motor 21 is determined using a control map shown in FIG. 28 stored in the ROM 132, based on the target air temperature TAO calculated at step S340. However, the map in FIG. 28 is set in a stationary condition where the water temperature Tw increases sufficiently and heating capacity of the heater core 127 is sufficient.

For example, when the vehicle air conditioner 1 is started and rapid heating is performed in a passenger compartment in this case where the water temperature is low in winter, the air amount is determined using the map in FIG. 28. At this time, since the target air temperature TAO is higher than a predetermined temperature TAO6 (e.g., 70° C.), the amount of conditioned air becomes large. However, since the water temperature Tw is low, temperature of conditioned air, having passed through the heater core 127, does not increase substantially. Therefore, cold air is blown to the passenger, and uncomfortable feeling is given to the passenger.

Figure 29:
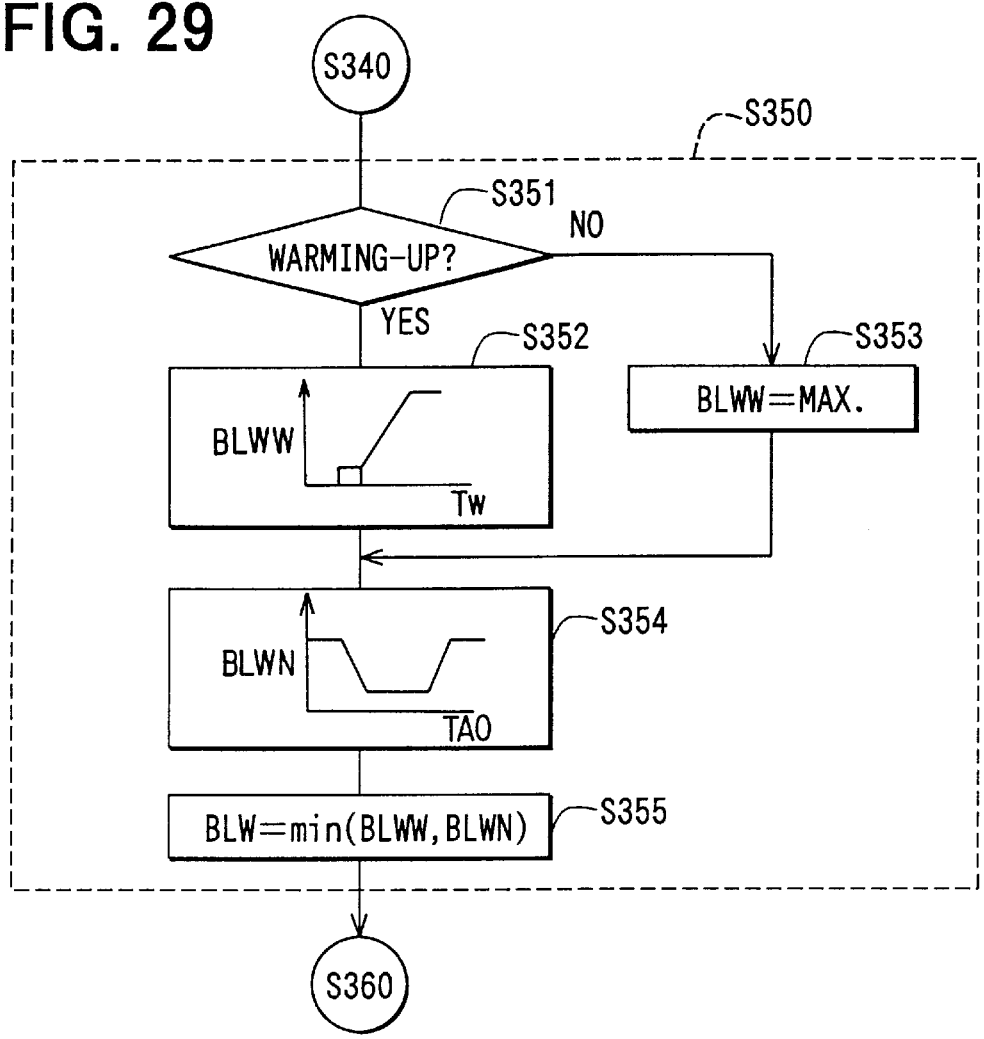
FIG. 29 is a flow diagram showing a specific example of determining the blower voltage according to the ninth embodiment.

In the ninth embodiment of the present invention, the amount of conditioned air is performed while the warming-up control operation is considered as shown in FIG. 29. At step S351, the amount of conditioned air is increased in accordance with the water temperature Tw, and it is determined whether it is in the warming-up control operation where rapid heating is performed in the passenger compartment. The determination method at step S351 is identical to the method in FIG. 27 described above. When the target air temperature TAO is equal to or higher than the predetermined temperature TAO5, it is determined to be in the warming-up control operation.

Figure 30:
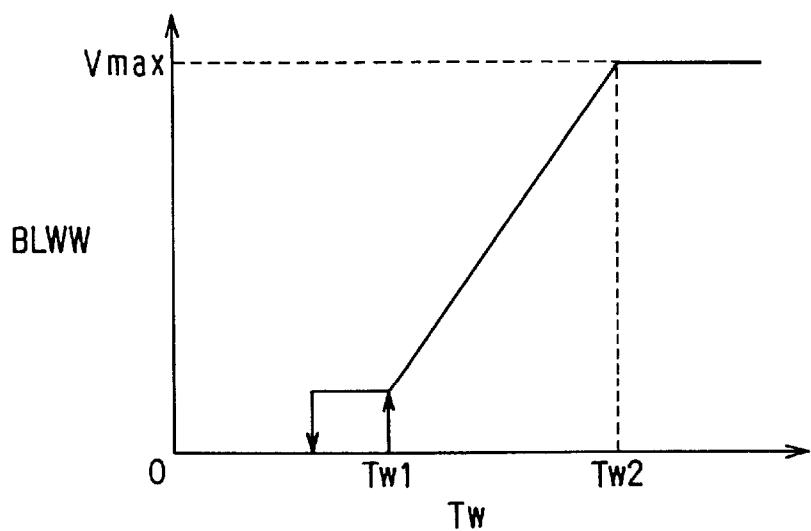
FIG. 30 is a characteristic graph showing a relationship between hot water temperature (Tw) and a blower voltage in the ninth embodiment.

When it is determined to be in the warming-up control operation at step S351, a blower voltage BLWW in the warming-up control operation is determined as the blower voltage by using the map shown in FIG. 30 stored in the ROM 132. In the map shown in FIG. 30, the blower motor 21 is stopped (BLWW=0) when the water temperature is lower than a predetermined temperature Tw1. When the water temperature Tw is between the predetermined temperature Tw1 (e.g., 50° C.) and a predetermined temperature Tw2 (e.g., 80° C., Tw2>Tw1), the blower voltage BLWW increase as the water temperature Tw increases. When the water temperature is equal to or higher than predetermined temperature Tw2, the blower voltage BLWW is set at a maximum voltage Vmax.

When the warming-up control operation is not determined at step S351, the blower voltage BLWW is set at the maximum voltage Vmax at step S353.

At step S354, the blower voltage BLWN in the stationary operation is determined using the map shown in FIG. 28 irrespective of any one of the warming-up control operation and the stationary operation. At step S355, a smaller one voltage, between the blower voltages BLWW, BLWN determined at steps S352–S354, is determined as the output blower voltage BLW. Thus, the amount of conditioned air can be suitably determined in the warming-up control operation and in the stationary operation.

(Tenth Embodiment)

Figure 31:
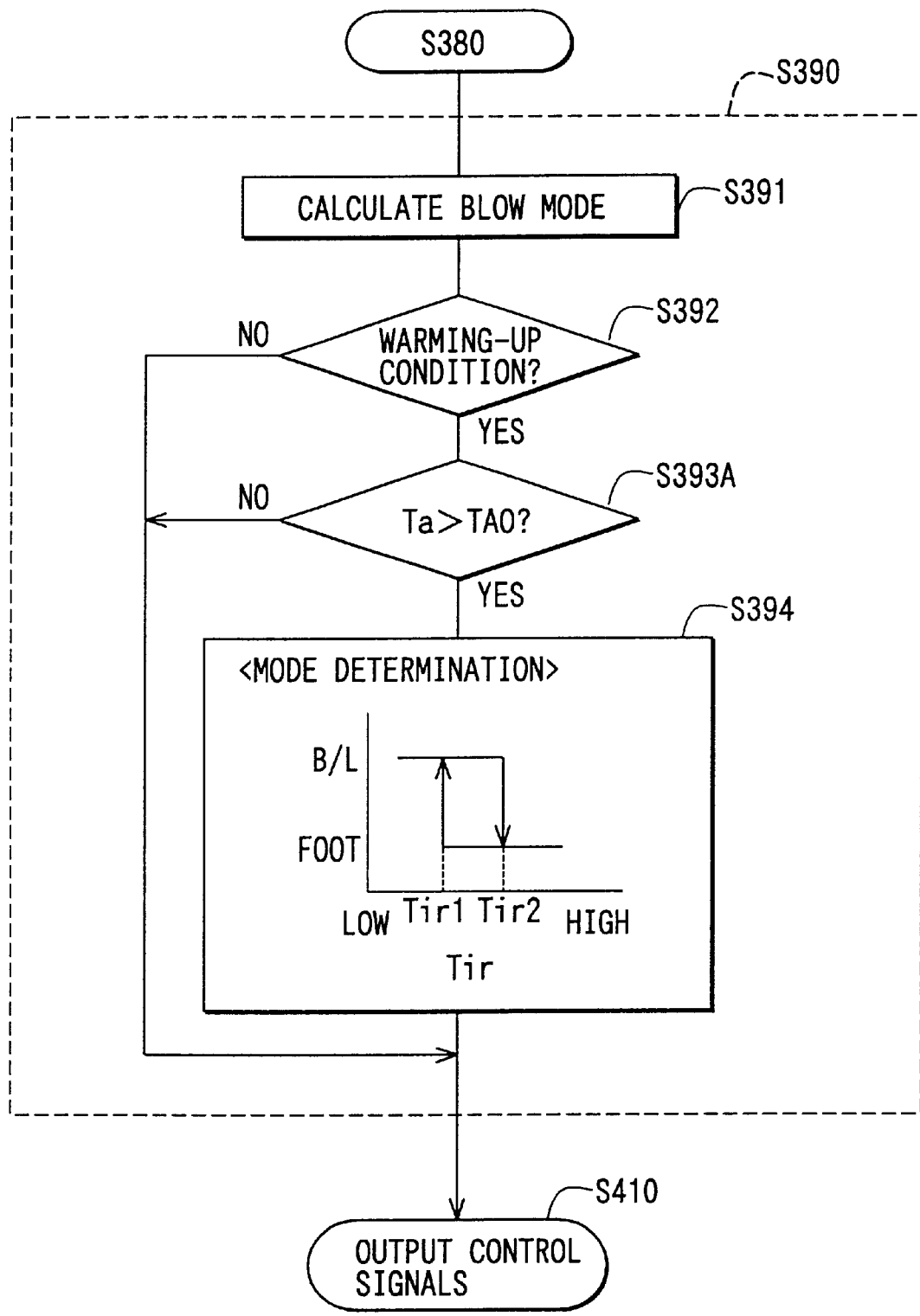
FIG. 31 is a flow diagram showing a specific example of determining an air outlet mode according to a tenth preferred embodiment of the present invention.

The tenth embodiment of the present invention will be now described with reference to FIG. 31. In the above-described ninth embodiment of the present invention, an air temperature sensor for detecting the temperature of conditioned air is not provided. However, in the tenth embodiment of the present invention, the air temperature sensor is added, the air outlet mode switching more suitable to the thermal feeling of the passenger can be performed by directly detecting the temperature of conditioned air.

In FIG. 23, the air temperature sensor is disposed between a mixing portion where hot air having passed through the heater core 127 and cool air having passed through the bypass passage 130 are mixed, and a branch portion branched to the air outlets 111–113, to detect the temperature Ta of conditioned air.

In the above-described ninth embodiment, the temperature of conditioned air is estimated using the water temperature Tw at step S393 shown in FIG. 25, and the switching time from the foot mode to the bi-level mode is determined. In the tenth embodiment, however, since the temperature Ta of conditioned air is directly detected by the air temperature sensor, this switching time can be determined by using the detected air temperature Ta at step S393A shown in FIG. 31 instead of step S393.

Therefore, it can be accurately determined whether low-temperature conditioned air is blown at the initial time in the warming-up control operation, so that the air outlet mode can be accurately switched to the foot mode when it is determined that low-temperature conditioned air is blown in the warming-up control operation. Accordingly, it can further surely prevent the low-temperature conditioned air from being blown from the face air outlet 112 and generating uncomfortable feeling. In the tenth embodiment, the other parts are similar to those of the above-described ninth embodiment.

(Eleventh Embodiment)

Figure 32:
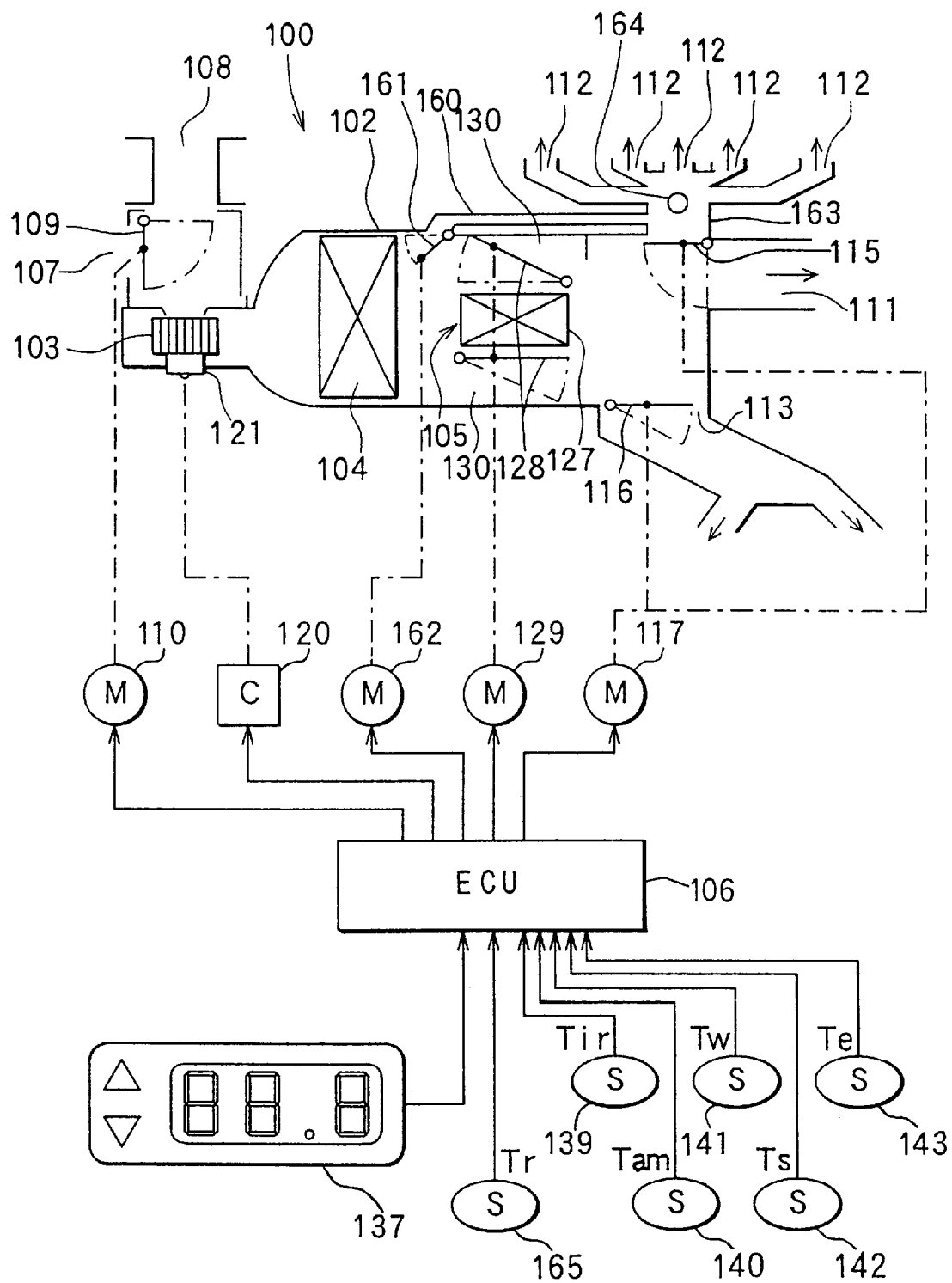
FIG. 32 is a schematic diagram showing an entire construction of a vehicle air conditioner according to an eleventh preferred embodiment of the present invention.

The eleventh embodiment of the present invention will be now described with reference to FIGS. 32 and 33. In the eleventh embodiment, as shown in FIG. 32, portions identical to those in the ninth embodiment are indicated by the same numerical references, respectively. Hereinafter, description will be made mainly only on portions different from those in the ninth embodiment.

In the eleventh embodiment of the present invention, a cool air bypass passage 160, through which cool air having passed through the evaporator 104 is directly introduced toward the face air outlet 112, is provided. Further, a cool air bypass damper 161, for adjusting an amount of cool air passing through the cool air bypass passage 160, is provided. An open degree of the cool air bypass damper 161 is controlled by a servomotor 162.

A face air temperature sensor 164, for detecting temperature of air blown from the face air outlets 112, is disposed in an entrance passage portion 163 of the plural face air outlets 112 (e.g., five face air outlets 112 in FIG. 32). Further, an inside air temperature sensor 165 for detecting inside air temperature Tr is provided. Detection signals from these sensors 164, 165 are also inputted to the ECU 106, and they are used for controlling the servomotor 162.

In the eleventh embodiment of the present invention, two air mixing dampers 128 are operatively linked so as to adjust the air temperature. The face air outlets 112 and the defroster air outlet 111 are alternately opened and closed by one face damper 115.

In the eleventh embodiment of the present invention, the air amount flowing through the cool air bypass passage 60 is adjusted by controlling the open degree of the cool air bypass damper 161 in the bi-level mode, so that the temperature of air blowing toward the face area can be controlled independently from the temperature of air blowing toward the foot area. Accordingly, the temperature of air blown toward the upper side and the temperature of air blown toward the lower side can be controlled independently from each other in the bi-level mode.

Figure 33:
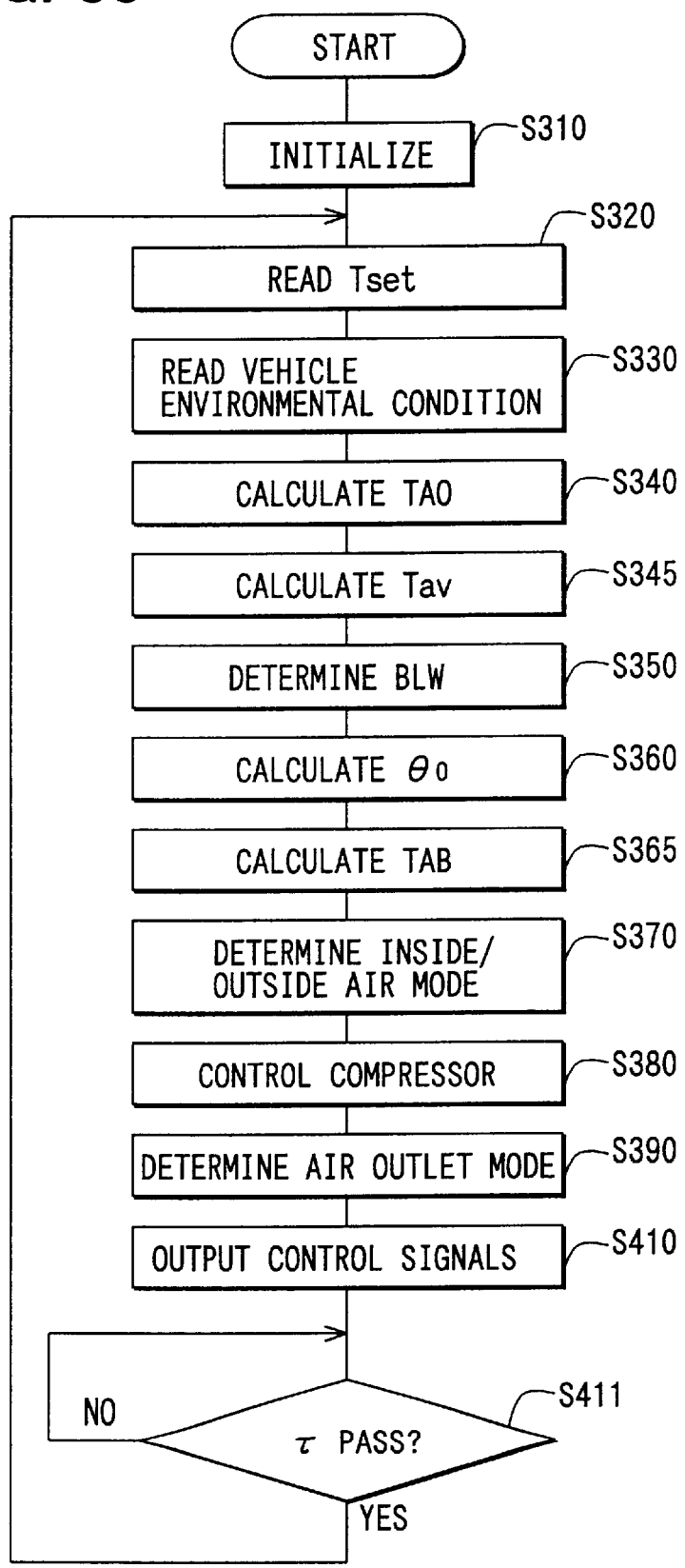
FIG. 33 is a flow diagram showing an air-conditioning control of the vehicle air conditioner according to the eleventh embodiment.

In the flow diagram of air-conditioning control in the eleventh embodiment, as shown in FIG. 33, steps S310–S640 are identical to those in the ninth embodiment, respectively. At step S345, a target face air temperature Tav blown toward the upper side of the passenger compartment is obtained using a formula (Tav=Tset−α). Here, Tset indicates a set temperature of the temperature setting switch 137, and α indicates temperature correction value. For example, the temperature correction value α is obtained as follows.

First, a deviation between the set temperature Tset and the inside air temperature Tr of the passenger compartment (Tset−Tr) is obtained, and a solar radiation coefficient GW, which increases as the deviation is changed to a minus side, is obtained. Solar radiation correction intensity Ts' is obtained by multiplying the solar radiation coefficient GW by solar radiation intensity Ts. Then, the temperature correction value α obtained using a control map having a relationship between the solar radiation correction intensity Ts' and the temperature correction value α. In this control map, the temperature correction value α increases as the solar radiation correction intensity Ts' increases. Accordingly, as the solar radiation correction intensity Ts' increases, the face air temperature Tav is decreased.

Steps S350, S360 in the eleventh embodiment are identical to those in the ninth embodiment, respectively. At step S365, a target driving time (target energizing time) TAB of the driving servomotor 162 of the cool air bypass damper 161 is calculated. In the eleventh embodiment, further, the open degree of the cool air bypass damper 161 is adjusted by adjusting the driving time of the driving servomotor 162.

Specifically, the target driving time TAB is calculated as follows, for example. First, a deviation Enf (i.e., Tf−Tav) between an actual face air temperature Tf detected by the face air temperature sensor 164 and a target face air temperature Tav calculated at step S345 is obtained. Then, a deviation control value EnB is calculated based on this deviation Enf and a correction value due to a target open degree θo calculated at step S360.

Next, operational processing is performed proportionally to the deviation control value EnB by a predetermined operational cycle time (e.g., four seconds), thereby calculating the target driving time TAB.

When the target driving time TAB is larger than zero (TAB>0), the cool air bypass damper 161 is driven by the driving servomotor 162 so as to increase its open degree. When the target driving time TAB is smaller than zero (TAB<0), the cool air bypass damper 161 is driven by the driving servomotor 162 so as to decrease its open degree. When the target driving time TAB is equal to zero (TAB=0), the open degree of the cool air bypass damper 161 is maintained by de-energizing the driving servomotor 162. In the eleventh embodiment, the other parts are similar to those of the above-described ninth embodiment.

(Other Embodiments)

In the above-described first to eighth embodiments of the present invention, the surface temperature only in the clothes portion of the passenger M is detected by the surface temperature sensor 31, so that the thermal-feeling estimation value Ss is calculated. However, the surface temperature on the clothes portion of the passenger M and the surface temperature on a face skin thereof can be detected by the surface temperature sensor 31 to calculate the thermal-feeling estimation value Ss.

Since temperature change is smaller on the face portion than that on the clothes portion, the thermal-feeling estimation value Ss is more stable than in the case where the thermal-feeling estimation value Ss is calculated using the surface temperature only on the clothes portion, thereby stabilizing air-conditioning control. Accordingly, even when the face portion is displaced outside the temperature detection range of the surface temperature sensor 31, the thermal feeling of the passenger M can be more accurately estimated than in a conventional case where the thermal feeling is estimated based on only the surface temperature on the face skin.

Further, temperature of the hand skin of the passenger M can be also detected, and the thermal-feeling estimation value Ss can be calculated using the surface temperature on the clothes portion and the surface temperature on the hand skin.

In the above-described first to eighth embodiments of the present invention, the thermal feeling target value St is calculated in consideration of the set temperature Tset, the outside air temperature Tam and the solar radiation intensity Ts. However, vehicle speed information can be further added as the vehicle environmental information relative to the thermal feeling of the passenger M, and the thermal feeling target value St can be calculated in consideration of the vehicle speed together with them. Specifically, the thermal feeling target value St can be set cooler at a lower vehicle speed than at a higher vehicle speed, so that the thermal feeling St can be calculated so as to more suitably coincide with the thermal feeling of the passenger M.

In the above first to eighth embodiments of the present invention, the control coefficient K in the formulas (3), (7)–(9), for calculating the target air temperature TAO, can be changed as time passes after air-conditioning operation is started. Specifically, the control coefficient K is set larger for a predetermined time from a starting time of air-conditioning operation than after the predetermined time passes from the starting time. Thus, the air-conditioning control can be made sensitive at the initial time of the starting of air-conditioning operation, thereby improving immediate control feeling of air-conditioning operation. When air temperature in the passenger compartment becomes stable after the predetermined time passes from the starting time, the air-conditioning control can be made insensitive, thereby preventing control fluctuation.

In the above-described first to eighth embodiments of the present invention, the control coefficient K in the formulas (3), (7)–(9) can be changed in accordance with a change of the thermal-feeling estimation value Ss per unit time or a change of the clothes surface temperature Tir per unit time. Specifically, the control coefficient K is set larger when the change value is equal to or larger than a predetermined value than when the change value is lower than the predetermined value. Generally, because the above change value becomes larger at the initial time of the starting of air-conditioning operation, the air-conditioning operation can be effectively controlled.

In the above-described first to eighth embodiments of the present invention, the control coefficient K in the formulas (3), (7)–(9) can be changed in accordance with a difference between the thermal feeling target value St and the thermal-feeling estimation value Ss. Specifically, the control coefficient K is set larger when the difference (absolute value) is equal to or larger than a predetermined value, as compared with a case where the difference is lower than the predetermined value. Generally, since the above difference becomes larger at the initial time of the starting of air-conditioning operation, the air-conditioning operation can be effectively controlled.

In the above-described first to eighth embodiments of the present invention, the control coefficient K in the formulas (3), (7)–(9) can be changed in accordance with a difference between the set temperature Tset and the inside temperature. Specifically, the control coefficient K is set larger when the difference (absolute value) is equal to or larger than a predetermined value, than when the difference is lower than the predetermined value. Generally, because the above difference becomes larger at the initial time of the starting of air-conditioning operation, the air-conditioning operation can be effectively controlled.

In the above-described first to eighth embodiments of the present invention, when the thermal-feeling estimation value Ss calculated using the formula is larger, the calculated value can be restricted to be lower than a predetermined value. In the first embodiment of the present invention, when the thermal-feeling estimation value is +5, the thermal feeling is estimated to be very hot. When the thermal-feeling estimation value is −5, the thermal feeling is estimated to be very cold. However, the predetermined value can be set at 5, and an absolute value of the calculated thermal-feeling estimation value Ss can be set at five when the absolute value of the calculated thermal-feeling estimation value Ss is larger than five. Further, the thermal feeling target value St can be also restricted below a predetermined value in the same manner.

Accordingly, an abnormal value of the thermal-feeling estimation value Ss and the thermal feeling target value St can be eliminated, thereby preventing abnormal control (extremely cooling, and extremely heating).

Further, a maximum value of the thermal-feeling estimation value Ss is restricted below a first predetermined value while a maximum value of the thermal feeling target value St is restricted below a second predetermined value, and the second predetermined value is set larger than the first predetermined value. Thus, cooling performance and heating performance can be set larger at a transition time, and the air-conditioning operation can be effectively controlled.

Further, a minimum value of the thermal-feeling estimation value Ss can be restricted to be lower than a fourth predetermined value while a minimum value of the thermal feeling target value St can be restricted to be larger than a third predetermined value, and the fourth predetermined value can be set larger than the third predetermined value.

The solar radiation sensor 37 can be eliminated in the above-described first embodiment of the present invention. In this case, the TAO calculation of formula (3) is changed to a formula of (TAO=K×(St−Ss)−Kam×Tam+C), and the Ss calculation of formula (2) is changed to a formula of (St=Sset+Sam).

Alternatively, the outside air temperature sensor 38 can be eliminated in the above-described first embodiment of the present invention. In this case, the TAO calculation formula (3) is changed to a formula of (TAO=K×(St−Ss)−Ks×Ts+C), and the Ss calculation formula (2) is changed to a formula of (St=Sset+Ssun).

In the above-described first embodiment of the present invention, the target air temperature TAO is calculated based on the difference between the thermal feeling target value St and the thermal-feeling estimation value Ss and the like. However, the thermal feeling target value St in the TAO calculation formula described in the first embodiment can be is eliminated. In this case, the air-conditioning operation is controlled, so that the thermal-feeling estimation value Ss becomes zero, that is, the thermal feeling of the passenger M becomes non-feeling.

In the above-described first to the eighth embodiments of the present invention, the infrared sensor using a thermopile detector is used as the surface temperature sensor 31. However, an infrared sensor using a bolometer detector constructed by a resistor having a large temperature coefficient or an another type infrared sensor can be used as the surface temperature sensor 31. Further, an another type surface sensor, which can detect the surface temperature of a temperature-detected body in a non-contact state, can be used as the surface temperature sensor 31 without being limited to the infrared sensor.

In the above-described ninth to eleventh embodiments of the present invention, the bi-level mode is set as the first mode where air is blown toward at least the upper body side of the passenger, in the warming-up control operation. However, an all outlets open mode (multi-blowing mode), where all the air outlets of the face air outlet 112, the foot air outlet 113 and the defroster air outlet 111 are opened at the same time, can be set as the first mode. Accordingly, the windshield can be defrosted while the foot portion of the passenger and the upper half body side such as hands of the passenger can be immediately heated in the warming-up control operation.

While present invention has been shown and described with reference to the foregoing preferred embodiments, it will be apparent to those skilled in the art that changes in form and detail may be made therein without departing from the scope of the invention as defined in the appended claims.

What is claimed is:

1. An air conditioner for a vehicle having a passenger compartment, comprising:
   a surface temperature sensor for detecting a surface temperature on a clothes portion of a passenger and for outputting a clothes temperature signal;
   estimation-value calculating means for calculating an estimation value of thermal feeling for a passenger in the passenger compartment, based on the clothes temperature signal; and
   a control unit for performing air-conditioning control in the passenger compartment, based on the estimation value of the thermal feeling; wherein
   the surface temperature sensor is disposed to detect only the surface temperature of the clothes portion of an upper half body of the passenger.

2. The air conditioner according to claim 1, wherein the control unit performs the air-conditioning control in the passenger compartment, in accordance with a difference between the estimation valve, and a target value of the thermal feeling that is an estimation value of target thermal feeling comfortable for the passenger, in such a manner that the estimation value of the thermal feeling coincides with the target value of the thermal feeling.

3. The air conditioner according to claim 2, wherein the thermal feeling target value is calculated using vehicle environmental information relative to the thermal feeling of the passenger and thermal feeling information determined by preference of the passenger.

4. The air conditioner according to claim 3, wherein the vehicle environmental information is at least one of a solar radiation intensity, an outside air temperature, a relative humidity and a vehicle speed.

5. The air conditioner according to claim 2, wherein the thermal feeling target value is changed in accordance with the clothes amount of the passenger.

6. The air conditioner according to claim 2, wherein a maximum value of the estimation value of the thermal feeling and a maximum value of the target value of the thermal feeling are respectively restricted to be equal to or lower than a predetermined value.

7. The air conditioner according to claim 6, wherein:
   the maximum value of the estimation value of the thermal feeling is restricted below a first predetermined value while the maximum value of the target value of the thermal feeling is restricted below a second predetermined value, and the second predetermined value is set larger than the first predetermined value; and
   a minimum value of the target value of the thermal feeling is restricted above a third predetermined value while a minimum value of the estimation value of the thermal feeling is restricted above a fourth predetermined, and the fourth predetermined value is set larger than the third predetermined value.

8. The air conditioner according to claim 1, wherein the surface temperature sensor is disposed to detect the surface temperature of the clothes portion of an upper half body of the passenger.

9. The air conditioner according to claim 9, wherein the estimation-value calculating means calculates the estimation value of the thermal feeling by using the clothes temperature signal and vehicle environmental information relative to the thermal feeling of the passenger.

10. The air conditioner according to claim 9, wherein the vehicle environmental information is a solar radiation intensity.

11. The air conditioner according to claim 1, further comprising:
target temperature calculating means for calculating a target air temperature to be blown into the passenger compartment, by using the following formula:

$$TAO=K\times(St-Ss)+C,$$

wherein,
TAO indicates the target air temperature;
K indicates a control coefficient;
St indicates a target value of thermal feeling comfortable for the passenger;
Ss indicates the estimation value of the thermal feeling; and
C indicates a constant.

12. The air conditioner according to claim 11, wherein the control coefficient K is changeable.

13. The air conditioner according to claim 1, further comprising:
target temperature calculating means for calculating a target air temperature to be blown into the passenger compartment, by using the following formula:

$$TAO=K\times(St-Ss)-Kt\times\int(St-Ss)dt+C,$$

wherein,
TAO indicates the target air temperature;
K indicates a control coefficient;
Kt indicates a coefficient of an integral term;
St indicates a target value of the thermal feeling comfortable for the passenger;
Ss indicates the estimation value of the thermal feeling; and
C indicates a constant.

14. The air conditioner according to claim 13, wherein the control coefficient K is changeable.

15. The air conditioner according to claim 1, further comprising:
target temperature calculating means for calculating a target air temperature to be blown into the passenger compartment, by using the following formula:

$$TAO=K\times(St-Ss)-Kt\times\int(St-Ss)dt-Kd\times d(St-Ss)/dt+C,$$

wherein,
TAO indicates the target air temperature;
K indicates a control coefficient;
Kt indicates a coefficient of an integral term;
Kd indicates a coefficient of a differential term;
St indicates a target value of the thermal feeling comfortable for the passenger;
Ss indicates the estimation value of the thermal feeling; and
C indicates a constant.

16. The air conditioner according to claim 15, wherein the control coefficient K is changeable.

17. The air conditioner according to claim 1, further comprising
a mode switching unit for switching one of a first mode where air is blown toward at least an upper side of the passenger, and a second mode where air is blown toward at least a lower side of the passenger while a flow of air blown toward the upper side is interrupted, based on the surface temperature detected by the surface temperature sensor.

18. An air conditioner for a vehicle having a passenger compartment, comprising:
a surface temperature sensor for detecting a surface temperature on a clothes portion of a passenger and for outputting a clothes temperature signal;
estimation-value calculating means for calculating an estimation value of thermal feeling for a passenger in the passenger compartment, based on the clothes temperature signal; and
a control unit for performing air-conditioning control in the passenger compartment, based on the estimation value of the thermal feeling; wherein
the estimation-value calculating means calculates the estimation value of the thermal feeling by using the clothes temperature signal and vehicle environmental information relative to the thermal feeling of the passenger;
the vehicle environmental information is a solar radiation intensity; and
the estimation value of the thermal feeling is calculated using the following formula:

$$Ss=Cclo\times(Tir-T)+Cs,$$

wherein,
Ss indicates the estimation value of the thermal feeling;
Cclo indicates a coefficient corresponding to a clothes amount of the passenger;
Tir indicates the surface temperature detected by the surface temperature sensor;
T indicates the surface temperature of the clothes portion in a standard condition; and
Cs indicates a value determined by the solar radiation intensity.

19. The air conditioner according to claim 18, further comprising:
a clothes-amount setting unit through which the passenger inputs clothes-amount information,
wherein the coefficient Cclo is determined based on the clothes-amount information inputted by the passenger using the clothes-amount setting unit.

20. The air conditioner according to claim 18, further comprising:
an outside air temperature sensor for detecting an outside air temperature,
wherein the coefficient Cclo is determined based on the outside air temperature.

21. The air conditioner according to claim 18, further comprising:
thermal-capacity estimating means for estimating thermal capacity of the clothes portion using a change rate of the surface temperature on the clothes portion, wherein the coefficient Cclo is determined based on the clothes amount estimated using the thermal capacity.

22. An air conditioner for a vehicle having a passenger compartment, comprising:
   a surface temperature sensor for detecting a surface temperature on a clothes portion of a passenger and for outputting a clothes temperature signal;
   estimation-value calculating means for calculating an estimation value of thermal feeling for a passenger in the passenger compartment, based on the clothes temperature signal; and
   a control unit for performing air-conditioning control in the passenger compartment, in accordance with a difference between the estimated valve of the thermal feeling, and a target value of the thermal feeling that is an estimation value of target thermal feeling comfortable for the passenger, in such a manner that the estimation value of the thermal feeling coincides with the target value of the thermal feeling;
   wherein the surface temperature sensor is disposed to detect only the surface temperature of the clothes portion of an upper half body of the passenger.

23. The air conditioner according to claim 22, wherein the estimation-value calculating means calculates the estimation value of the thermal feeling by using the clothes temperature signal and vehicle environmental information relative to the thermal feeling of the passenger.

24. The air conditioner according to claim 22, wherein the thermal feeling target value is calculated using vehicle environmental information relative to the thermal feeling of the passenger and thermal feeling information determined by preference of the passenger.

25. An air conditioner for a vehicle having a passenger compartment, comprising:
   a surface temperature sensor for detecting a surface temperature on a clothes portion of a passenger and for outputting a clothes temperature signal;
   estimation-value calculating means for calculating an estimation value of thermal feeling for a passenger in the passenger compartment, based on the clothes temperature signal; and
   a control unit for performing air-conditioning control in the passenger compartment, in accordance with a difference between the estimated valve of the thermal feeling, and a target value of the thermal feeling that is an estimation value of target thermal feeling comfortable for the passenger, in such a manner that the estimation value of the thermal feeling coincides with the target value of the thermal feeling; wherein
      the thermal feeling target value is calculated using vehicle environmental information relative to the thermal feeling of the passenger and thermal feeling information determined by preference of the passenger; and
      the vehicle environmental information is at least one of a solar radiation intensity, an outside air temperature, a relative humidity and a vehicle speed.

26. An air conditioner for a vehicle having a passenger compartment, comprising:
   a surface temperature sensor for detecting a surface temperature on a clothes portion of a passenger and for outputting a clothes temperature signal;
   estimation-value calculating means for calculating an estimation value of thermal feeling for a passenger in the passenger compartment, based on the clothes temperature signal; and
   a control unit for performing air-conditioning control in the passenger compartment, in accordance with a difference between the estimated valve of the thermal feeling, and a target value of the thermal feeling that is an estimation value of target thermal feeling comfortable for the passenger, in such a manner that the estimation value of the thermal feeling coincides with the target value of the thermal feeling;
   wherein the thermal feeling target value is changed in accordance with the clothes amount of the passenger.

27. An air conditioner for a vehicle having a passenger compartment, comprising:
   a surface temperature sensor for detecting a surface temperature on a clothes portion of a passenger and for outputting a clothes temperature signal;
   estimation-value calculating means for calculating an estimation value of thermal feeling for a passenger in the passenger compartment, based on the clothes temperature signal;
   a control unit for performing air-conditioning control in the passenger compartment, in accordance with a difference between the estimation valve of the thermal feeling, and a target value of the thermal feeling that is an estimation value of target thermal feeling comfortable for the passenger, in such a manner that the estimation value of the thermal feeling coincides with the target value of the thermal; and
   target temperature calculating means for calculating a target air temperature to be blown into the passenger compartment, by using the following formula:

$$TAO = K \times (St - Ss) + C,$$

wherein,
   TAO indicates the target air temperature;
   K indicates a control coefficient;
   St indicates a target value of the thermal feeling comfortable for the passenger;
   Ss indicates the estimation value of the thermal feeling; and
   C indicates a constant.

28. An air conditioner for a vehicle having a passenger compartment, comprising:
   a surface temperature sensor for detecting a surface temperature on a clothes portion of a passenger and for outputting a clothes temperature signal;
   estimation-value calculating means for calculating an estimation value of thermal feeling for a passenger in the passenger compartment, based on the clothes temperature signal;
   a control unit for performing air-conditioning control in the passenger compartment, in accordance with a difference between the estimation valve of the thermal feeling, and a target value of the thermal feeling that is an estimation value of target thermal feeling comfortable for the passenger, in such a manner that the estimation value of the thermal feeling coincides with the target value of the thermal; and
   target temperature calculating means for calculating a target air temperature to be blown into the passenger compartment, by using the following formula:

$$TAO = K \times (St - Ss) - Kt \times F(St - Ss)dt + C,$$

wherein,

TAO indicates the target air temperature;

K indicates a control coefficient;

Kt indicates a coefficient of an integral term;

St indicates a target value of the thermal feeling comfortable for the passenger;

Ss indicates the estimation value of the thermal feeling; and

C indicates a constant.

29. An air conditioner for a vehicle having a passenger compartment, comprising:

a surface temperature sensor for detecting a surface temperature on a clothes portion of a passenger and for outputting a clothes temperature signal;

estimation-value calculating means for calculating an estimation value of thermal feeling for a passenger in the passenger compartment, based on the clothes temperature signal;

a control unit for performing air-conditioning control in the passenger compartment, in accordance with a difference between the estimation valve of the thermal feeling, and a target value of the thermal feeling that is an estimation value of target thermal feeling comfortable for the passenger, in such a manner that the estimation value of the thermal feeling coincides with the target value of the thermal; and target temperature calculating means for calculating a target air temperature to be blown into the passenger compartment, by using the following formula:

$$TAO = K \times (St-Ss) - Kt \times \int (St-Ss)dt - Kd \times d(St-Ss)/dt + C,$$

wherein,

TAO indicates the target air temperature;

K indicates a control coefficient;

Kt indicates a coefficient of an integral term;

Kd indicates a coefficient of a differential term;

St indicates a target value of the thermal feeling comfortable for the passenger;

Ss indicates the estimation value of the thermal feeling; and

C indicates a constant.

30. An air conditioner for a vehicle having a passenger compartment, comprising:

a surface temperature sensor for detecting a surface temperature on a clothes portion of a passenger and for outputting a clothes temperature signal;

estimation-value calculating means for calculating an estimation value of thermal feeling for a passenger in the passenger compartment, based on the clothes temperature signal; and a control unit for performing air-conditioning control in the passenger compartment, in accordance with a difference between the estimated valve of the thermal feeling, and a target value of the thermal feeling that is an estimation value of target thermal feeling comfortable for the passenger, in such a manner that the estimation value of the thermal feeling coincides with the target value of the thermal feeling;

wherein a maximum value of the estimation value of the thermal feeling and a maximum value of the target value of the thermal feeling are respectively restricted to be equal to or lower.

31. The air conditioner according to claim 30, wherein:

the maximum value of the estimation value of the thermal feeling is restricted below a first predetermined value while the maximum value of the target value of the thermal feeling is restricted below a second predetermined value, and the second predetermined value is set larger than the first predetermined value; and a minimum value of the target value of the thermal feeling is restricted above a third predetermined value while a minimum value of the estimation value of the thermal feeling is restricted above a fourth predetermined, and the fourth predetermined value is set larger than the third predetermined value.

32. An air conditioner for a vehicle having a passenger compartment, comprising:

a surface temperature sensor for detecting a surface temperature of a passenger in the passenger compartment; and a mode switching unit being capable of automatically switching one of a first mode where air is blown at least toward an upper side of the passenger, and a second mode where air is blown at least toward a lower side of the passenger while a flow of air blown toward the upper side of the passenger is interrupted, wherein:

the mode switching unit switches between the first mode and the second mode based on the surface temperature of the passenger detected by the surface temperature sensor;

when the surface temperature of the passenger is lower than a first predetermined temperature in a warming-up control operation where temperature of air blown into the passenger compartment is increased after heating in the passenger compartment is started, the first mode is selected by the mode switching unit; and when the surface temperature of the passenger is higher than the first predetermined temperature in the warming-up control operation, the second mode is selected by the mode switching unit.

33. The air conditioner according to claim 32, wherein:

when temperature, relative to the temperature of air blown into the passenger compartment, is lower than a second predetermined temperature in the warming-up control operation, the second mode is selected; and when the temperature, relative to the temperature of air blown into the passenger compartment, is higher than the second predetermined temperature in the warming-up control operation, one of the first mode and the second mode is automatically switched based on the surface temperature of the passenger.

34. The air conditioner according to claim 33, further comprising:

a heating heat exchanger for heating air using a hot water as a heating source, wherein the temperature, relative to the temperature of air blown into the passenger compartment, is temperature of hot water.

35. The air conditioner according to claim 32, wherein the first mode is a bi-level mode where air is blown into the passenger compartment from both of a face air outlet, from which air is blown toward the upper side of the passenger, and a foot air outlet from which air is blown toward the lower side of the passenger in the passenger compartment.

36. The air conditioner according to claim 32, wherein the second mode is a foot mode where air is blown into the passenger compartment at least from a foot air outlet toward the lower side of the passenger.

37. The air conditioner according to claim 32, wherein the surface temperature sensor is an infrared sensor for detecting the surface temperature of the upper side of the passenger.

38. An air conditioner for a vehicle having a passenger compartment, comprising:
   a surface temperature sensor for detecting a surface temperature of a passenger in the passenger compartment; and
   a mode switching unit being capable of automatically switching one of a first mode where air is blown at least toward an upper side of the passenger, and a second mode where air is blown at least toward a lower side of the passenger while a flow of air blown toward the upper side of the passenger is interrupted, wherein:
      the mode switching unit switches between the first mode and the second mode based on the surface temperature of the passenger detected by the surface temperature sensor; and
      the first mode is a multi-blowing mode where air is blown into the passenger compartment from a face air outlet toward the upper side of the passenger, is blown from a foot air outlet toward the lower side of the passenger, and is blown from a defroster air outlet toward an inner surface of a windshield of the vehicle, at the same time.

39. An air conditioner for a vehicle having a passenger compartment, comprising:
   a first mode switching unit for switching one of a plurality of modes in accordance with an air-conditioning condition, the plurality of modes at least including a first mode where air is blown at least toward an upper side of a passenger in the passenger compartment, and a second mode where air is blown at least toward a lower side of the passenger while a flow of air blown toward the upper side of the passenger is interrupted;
   a surface temperature sensor for detecting a surface temperature of the passenger in the passenger compartment; and
   a second mode switching unit for switching one of the first mode and the second mode in accordance with the surface temperature of the passenger detected by the surface temperature sensor, wherein:
      the first mode switching unit switches one of the plurality of modes in an air-conditioning stationary operation; and
      the second mode switching unit switches one of the first mode and the second mode in a warming-up control operation where temperature of air is increased after heating in a passenger compartment is started.

40. The air conditioner according to claim 39, wherein:
   when temperature, relative to the temperature of air blown into the passenger compartment, is lower than a predetermined temperature in the warming-up control operation, the second mode is selected; and
   when the temperature, relative to the temperature of air blown into the passenger compartment, is higher than the predetermined temperature in the warming-up control operation, one of the first mode and the second mode is automatically switched based on the surface temperature of the passenger.

41. The air conditioner according to claim 39, further comprising:
   a heating heat exchanger for heating air using a hot water as a heating source,
   wherein the temperature, relative to the temperature of air blown into the passenger compartment, is temperature of hot water.

42. The air conditioner according to claim 39, wherein the first mode is a bi-level mode where air is blown into the passenger compartment from both of a face air outlet, from which air is blown toward the upper side of the passenger, and a foot air outlet from which air is blown toward the lower side of the passenger in the passenger compartment.

43. The air conditioner according to claim 39, wherein the first mode is a multi-blowing mode where air is blown into the passenger compartment from a face air outlet toward the upper side of the passenger, is blown from a foot air outlet toward the lower side of the passenger, and is blown from a defroster air outlet toward an inner surface of a windshield of the vehicle, at the same time.

44. The air conditioner according to claim 39, wherein the second mode is a foot mode where air is blown into the passenger compartment at least from a foot air outlet toward the lower side of the passenger.

45. The air conditioner according to claim 39, wherein the surface temperature sensor is an infrared sensor for detecting the surface temperature of the upper side of the passenger.

46. An air conditioner for a vehicle having a passenger compartment, comprising:
   calculation means for calculating a target air temperature to be blown into the passenger compartment;
   a first mode switching unit for switching one of a plurality of modes in accordance with the target air temperature, the plurality of modes at least including a first mode where air is blown at least toward an upper side of a passenger in the passenger compartment, and a second mode where air is blown at least toward a lower side of the passenger while a flow of air blown toward the upper side of the passenger is interrupted;
   a surface temperature sensor for detecting a surface temperature of the passenger in the passenger compartment;
   a second mode switching unit for switching one of the first mode and the second mode in accordance with the surface temperature of the passenger, detected by the surface temperature sensor; and
   determination means for determining a warming-up control operation in which temperature of air blown into the passenger compartment is increased after heating in the passenger compartment is started, wherein:
      when the warming-up control operation is determined by the determination unit, the first mode and the second mode are switched by the second mode switching unit based on the surface temperature of the passenger; and
      when an air-conditioning stationary operation is determined by the determination unit, the plurality of modes
   are switched by the first mode switching unit based on the target air it temperature.

47. The air conditioner according to claim 46, wherein,
   when the target air temperature is higher than a predetermined temperature, the warming-up control operation is determined by the determination means.

48. The air conditioner according to claim 46, further comprising:
   a heating heat exchanger for heating air using a hot water as a heating source,
   wherein the temperature, relative to the temperature of air blown into the passenger compartment, is temperature of hot water.

49. The air conditioner according to claim 46, wherein the first mode is a bi-level mode where air is blown into the passenger compartment from both of a face air outlet, from which air is blown toward the upper side of the passenger, and a foot air outlet from which air is blown toward the lower side of the passenger in the passenger compartment.

50. The air conditioner according to claim 46, wherein the first mode is a multi-blowing mode where air is blown into the passenger compartment from a face air outlet toward the upper side of the passenger, is blown from a foot air outlet toward the lower side of the passenger, and is blown from a defroster air outlet toward an inner surface of a windshield of the vehicle, at the same time.

51. The air conditioner according to claim 46, wherein the second mode is a foot mode where air is blown into the passenger compartment at least from a foot air outlet toward the lower side of the passenger.

52. The air conditioner according to claim 46, wherein the surface temperature sensor is an infrared sensor for detecting the surface temperature of the upper side of the passenger.

* * * * *